(12) United States Patent
Sung et al.

(10) Patent No.: US 10,312,970 B2
(45) Date of Patent: Jun. 4, 2019

(54) APPARATUS AND METHOD FOR TRANSMITTING AND RECEIVING POWER WIRELESSLY

(71) Applicant: Samsung Electro-Mechanics Co., Ltd., Suwon-si (KR)

(72) Inventors: Jae Suk Sung, Suwon-si (KR); Chang Ik Kim, Suwon-si (KR); Chang Soo Kang, Suwon-si (KR); Hee Sun Han, Suwon-si (KR); Yong Woon Park, Suwon-si (KR); Hyung Wook Cho, Suwon-si (KR); Sung Heum Park, Suwon-si (KR); Sang Ho Cho, Suwon-si (KR); Chul Gyun Park, Suwon-si (KR); Ki Won Chang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 392 days.

(21) Appl. No.: 14/627,154

(22) Filed: Feb. 20, 2015

(65) Prior Publication Data

US 2015/0244424 A1 Aug. 27, 2015

(30) Foreign Application Priority Data

Feb. 21, 2014 (KR) .................. 10-2014-0020271
Feb. 21, 2014 (KR) .................. 10-2014-0020272
Sep. 12, 2014 (KR) .................. 10-2014-0121349

(51) Int. Cl.
*H02J 7/00* (2006.01)
*H04B 5/00* (2006.01)
(Continued)

(52) U.S. Cl.
CPC ............ *H04B 5/0037* (2013.01); *H02J 5/005* (2013.01); *H02J 7/0004* (2013.01); *H02J 7/025* (2013.01); *H02J 50/12* (2016.02); *H02J 50/90* (2016.02)

(58) Field of Classification Search
CPC ....................................................... H02J 7/025
(Continued)

(56) References Cited

U.S. PATENT DOCUMENTS

2007/0123316 A1 5/2007 Little
2010/0151808 A1 6/2010 Toncich et al.
(Continued)

FOREIGN PATENT DOCUMENTS

CN 102142697 A 8/2011
CN 102576243 A 7/2012
(Continued)

OTHER PUBLICATIONS

Japanese Office Action dated Jan. 19, 2016 in counterpart Japanese Application No. 2015-033275 (8 pages with English translation).
(Continued)

*Primary Examiner* — Yalkew Fantu
(74) *Attorney, Agent, or Firm* — NSIP Law

(57) ABSTRACT

An apparatus for transmitting power wirelessly includes a power transmitter configured to transmit power wirelessly to an apparatus for receiving power wirelessly, and an identification information manager configured to transmit first identification information allocated to the apparatus for transmitting power wirelessly to other devices.

21 Claims, 20 Drawing Sheets

(51) Int. Cl.
  *H02J 5/00* (2016.01)
  *H02J 7/02* (2016.01)
  *H02J 50/90* (2016.01)
  *H02J 50/12* (2016.01)

(58) Field of Classification Search
  USPC .................................................. 320/108
  See application file for complete search history.

(56) References Cited

U.S. PATENT DOCUMENTS

| | | |
|---|---|---|
| 2011/0043327 A1 | 2/2011 | Baarman et al. |
| 2011/0177787 A1 | 7/2011 | Hwang et al. |
| 2011/0181239 A1 | 7/2011 | Kadoyama |
| 2011/0184888 A1 | 7/2011 | Lee et al. |
| 2011/0195722 A1 | 8/2011 | Walter et al. |
| 2012/0046015 A1 | 2/2012 | Little |
| 2013/0134922 A1 | 5/2013 | Takagi |
| 2014/0125145 A1 | 5/2014 | Bae |
| 2014/0306649 A1 | 10/2014 | Akiyoshi et al. |
| 2015/0137601 A1 | 5/2015 | Fujita et al. |

FOREIGN PATENT DOCUMENTS

| | | |
|---|---|---|
| CN | 103004053 A | 3/2013 |
| EP | 2 348 604 A1 | 7/2011 |
| EP | 2355304 A2 | 8/2011 |
| JP | 2010-33479 A | 2/2010 |
| JP | 2011-154435 A | 8/2011 |
| JP | 2012-200056 A | 10/2012 |
| JP | 2013-502900 A | 1/2013 |
| JP | 2013-26813 A | 2/2013 |
| JP | 2013-150531 A | 8/2013 |
| KR | 10-2011-0083865 A | 7/2011 |
| KR | 10-2011-0088100 A | 8/2011 |
| KR | 10-1262641 B1 | 5/2013 |
| KR | 10-2013-0082952 A | 7/2013 |
| WO | WO 2011/025692 A1 | 3/2011 |
| WO | WO 2014/017142 A1 | 1/2014 |

OTHER PUBLICATIONS

Extended European Search Report dated Jun. 18, 2015, in counterpart European Application No. 15155536.4 (7 pages, in English).
Chinese Office Action dated Nov. 6, 2017, in corresponding Chinese Application No. 201510087838.3 (24 pages in English, 10 pages in Chinese).
Korean Office Action dated Oct. 2, 2018 in counterpart Korean Patent Application No. 10-2014-0121349 (21 pages, in Korean with English translation).
Japanese Office Action dated Jan. 8, 2019 in corresponding Japanese Patent Application No. 2017-009854 (6 pages in English and 3 pages in Japanese).
Japanese Office Action dated Feb. 19, 2019 in corresponding Japanese Patent Application No. 2018-048656 (5 pages in English, 2 pages in Japanese).

|  | b₇ | b₆ | b₅ | b₄ | b₃ | b₂ | b₁ | b₀ |
|---|---|---|---|---|---|---|---|---|
| B₀ | Major Version | | | | Minor Version | | | |
| B₁ | (msb) Manufacturer Code | | | | | | | (lsb) |
| B₂ | | | | | | | | |
| B₃ | Exit | (msb) Basic Device Identifier | | | | | | |
| ... | | | | | | | | |
| B₆ | | | | | | | | (lsb) |

FIG. 9

APPARATUS AND METHOD FOR TRANSMITTING AND RECEIVING POWER WIRELESSLY

CROSS-REFERENCE TO RELATED APPLICATIONS

This application claims the benefit under 35 USC 119(a) of Korean Patent Application Nos. 10-2014-0020271 filed on Feb. 21, 2014, 10-2014-0020272 filed on Feb. 21, 2014, and 10-2014-0121349 filed on Sep. 12, 2014 in the Korean Intellectual Property Office, the entire disclosures of which are incorporated herein by reference for all purposes.

BACKGROUND

This application relates to an apparatus for transmitting power wirelessly, an apparatus for receiving power wirelessly, a mobile terminal, an application server, a location-based service system using the same, and an application therefor.

In accordance with the development of wireless technologies, wireless technologies have been used to enable various functions, from the transmission of data to the transmission of power, to be performed. Recently, technologies for transmitting power wirelessly, thereby allowing an electronic device to be charged with power in a non-contact manner, have become an important topic.

Such technologies for transmitting power wirelessly allow for the development of devices in which power may be freely charged without the necessity of physically connecting a mobile terminal and a charging device to each other. Therefore, technologies for transmitting power wirelessly have been developed due to the high potential thereof for convenience and freedom in charging mobile devices.

However, general wireless charging technologies only allow for power transmission between an apparatus for transmitting power wirelessly and an apparatus for receiving power wirelessly, and have certain limitations, in that a separate user-customized service or other specialized service cannot be provided by the general wireless charging technologies.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for transmitting power wirelessly includes a power transmitter configured to transmit power wirelessly to an apparatus for receiving power wirelessly; and an identification information manager configured to transmit first identification information allocated to the apparatus for transmitting power wirelessly to other devices.

The first identification information may be associated with zone information regarding a zone in which the apparatus for transmitting power wirelessly is located.

The apparatus for transmitting power wirelessly may further include a power charging controller configured to authenticate an authority for wireless charging of the apparatus for receiving power wirelessly.

The identification information manager may be further configured to transmit the first identification information to the apparatus for receiving power wirelessly in response to the authority for the wireless charging of the apparatus for receiving power wirelessly being authenticated.

The power charging controller may be further configured to perform an authentication using any one or any combination of communications service provider information, terminal information, user information, and remaining power information of a mobile terminal connected to the apparatus for receiving power wirelessly.

The power charging controller may be further configured to determine the authority or a provision time for the wireless charging of the apparatus for receiving power wirelessly using authentication information transmitted by an application server having received the first identification information.

The apparatus for transmitting power wirelessly may further include a communications transceiver connectable to an application server; and a service data manager configured to receive location service data associated with a zone in which the apparatus for transmitting power wirelessly is located from the application server.

The apparatus for transmitting power wirelessly may further include a short distance wireless communications transceiver wirelessly connectable to a mobile terminal in which the apparatus for receiving power wirelessly is mounted or that is connectable to the apparatus for receiving power wirelessly; and the identification information manager may be further configured to obtain second identification information allocated to the mobile terminal using the short distance wireless communications transceiver and transmit the first identification information and the second identification information to an application server.

In another general aspect, an apparatus for receiving power wirelessly connectable to a mobile terminal includes a power receiver configured to wirelessly receive power transmitted by an apparatus for transmitting power wirelessly; and an identification information transmitter configured to receive first identification information allocated to the apparatus for transmitting power wirelessly from the apparatus for transmitting power wirelessly and transmit the first identification information to the mobile terminal.

The identification information transmitter may be further configured to use an identifier of the apparatus for transmitting power wirelessly used in a protocol for transmitting and receiving power wirelessly as the first identification information.

The apparatus for receiving power wirelessly may further include a short distance wireless communications transceiver; and the identification information transmitter may be further configured to receive the first identification information from the apparatus for transmitting power wirelessly using the short distance wireless communications unit.

The identification information transmitter may be further configured to obtain second identification information allocated to the mobile terminal and transmit the second identification information to the apparatus for transmitting power wirelessly.

In another general aspect, a mobile terminal includes a power charger connectable to an apparatus for receiving power wirelessly and configured to receive power wirelessly from the apparatus for receiving power wirelessly and charge a power storage of the mobile terminal using the received power; and a controller configured to obtain first identification information allocated to an apparatus for transmitting power wirelessly and transmit second identification information allocated to the mobile terminal or the first identification information to an application server.

The first identification information may be associated with zone information regarding a zone in which the apparatus for transmitting power wirelessly is located.

The controller may be further configured to receive location service data associated with a zone in which the mobile terminal is located from the application server.

In another general aspect, a mobile terminal includes a power charger connectable to an apparatus for receiving power wirelessly and configured to receive power wirelessly from the apparatus for receiving power wirelessly and charge a power storage of the mobile terminal using the received power; and a controller configured to transmit first identification information allocated to the mobile terminal to an apparatus for transmitting power wirelessly and receive location service data associated with a zone in which the mobile terminal is located from the apparatus for transmitting power wirelessly.

In another general aspect, an application server includes a memory configured to store location data in which first identification information allocated to an apparatus for transmitting power wirelessly and zone information regarding a zone in which the apparatus for transmitting power wirelessly is located are associated with each other; and a location service transmitter configured to determine a location of a mobile terminal receiving power from the apparatus for transmitting power wirelessly using the location data.

The location service transmitter may be further configured to use the first identification information and second identification information allocated to the mobile terminal to determine the zone in which the apparatus for transmitting power wirelessly is located as the location of the mobile terminal.

The location service transmitter may be further configured to transmit location service data associated with the determined location of the mobile terminal to either one or both of the mobile terminal and the apparatus for transmitting power wirelessly.

In another general aspect, an application executable in a mobile terminal includes a function of obtaining first identification information allocated to an apparatus for transmitting power wirelessly; a function of managing second identification information allocated to the mobile terminal; and a function of transmitting either one or both of the first identification information and the second identification information to other devices.

The application may further include a function of receiving and displaying location service data associated with a location of the mobile terminal.

In another general aspect, a location-based service system includes an apparatus for transmitting power wirelessly configured to transmit power wirelessly to an apparatus for receiving power wirelessly; a mobile terminal configured to receive power received by the apparatus for receiving power wirelessly; and an application server configured to identify a location of the apparatus for transmitting power wirelessly, determine the identified location of the apparatus for transmitting power wirelessly as a location of the mobile terminal, and transmit location-based service data.

Other features and aspects will be apparent from the following detailed description, the drawings, and the claims.

BRIEF DESCRIPTION OF THE DRAWINGS

FIGS. 7 through 12 illustrate various examples of an apparatus for transmitting power wirelessly.

DETAILED DESCRIPTION

Figure 1:
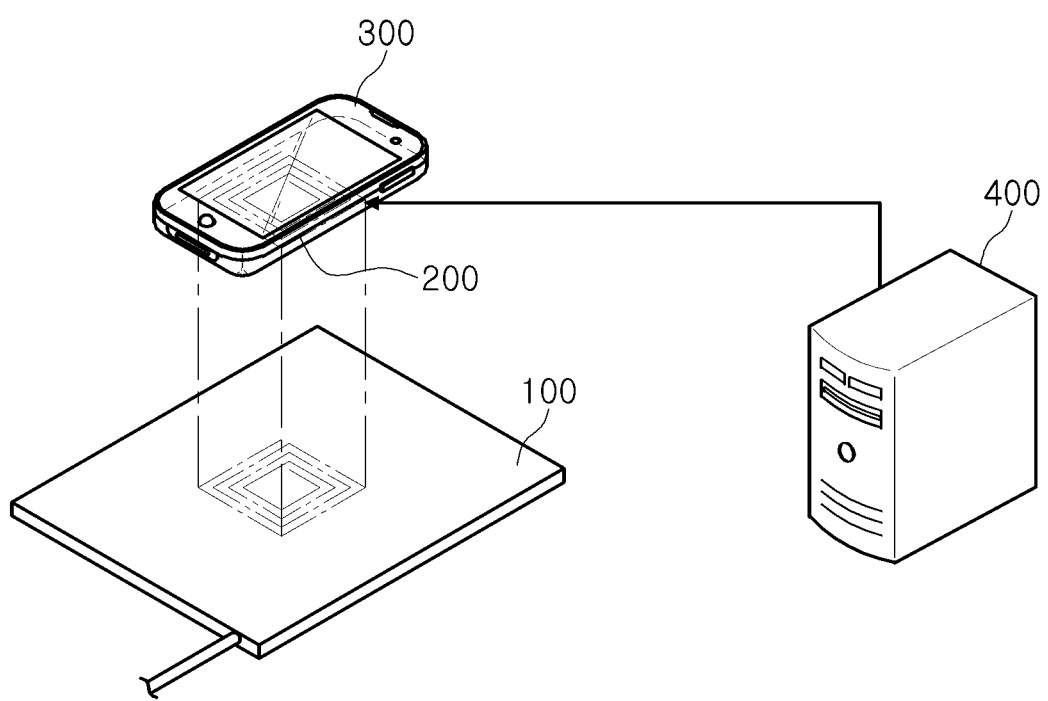
FIG. 1 illustrates an example of a location-based service system.

The following description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. In the drawings, the relative size, proportions, and depiction of elements in the drawings may be exaggerated for clarity, illustration, and convenience.

FIG. 1 illustrates an example of a location-based service system.

As illustrated in FIG. 1, the location-based service system includes an apparatus for transmitting power wirelessly 100, an apparatus for receiving power wirelessly 200, a mobile terminal 300, and an application server 400.

The apparatus for transmitting power wirelessly 100 wirelessly transmits power to the apparatus for receiving power wirelessly 200.

A location of the apparatus for transmitting power wirelessly 100 is fixed. Since the apparatus for receiving power wirelessly 200 and the mobile terminal 300 are movable, locations of the apparatus for receiving power wirelessly 200 and the mobile terminal 300 cannot be specified. However, the location of the apparatus for transmitting power wirelessly 100 can be specified.

Information regarding the location of the apparatus for transmitting power wirelessly 100 is managed by the application server 400, the mobile terminal 300, or any other device having the capability of managing the location of the apparatus for transmitting power wirelessly 100. Hereinafter, although an example in which the application server 400 manages the information regarding the location of the apparatus for transmitting power wirelessly 100 will be described, it is to be understood that this is merely an example, and other devices may manage the location of the apparatus for transmitting power wirelessly 100.

The apparatus for receiving power wirelessly 200 charges the mobile terminal 300 using the power wirelessly transmitted by the apparatus for transmitting power wirelessly 100.

The apparatus for transmitting power wirelessly 100 and the apparatus for receiving power wirelessly 200 are not limited to a specific standard. For example, the apparatus for transmitting power wirelessly 100 and the apparatus for receiving power wirelessly 200 may be operated according to a standard (for example, the Alliance for Wireless Power (A4WP) standard) in which a short distance communications scheme is set at the time of performing wireless charging. As another example, the apparatus for transmitting power wirelessly 100 and the apparatus for receiving power wirelessly 200 may be operated according to a standard (for example, the Wireless Power Consortium (WPC) standard or the Power Matters Alliance (PMA) standard) in which a short distance communications scheme is not available at the time of performing the wireless charging.

The mobile terminal 300 receives the power received by the apparatus for receiving power wirelessly 200.

The mobile terminal 300 receives a location-based service transmitted by the application server 400.

The application server 400 identifies the apparatus for transmitting power wirelessly 100 to determine a location of the mobile terminal 300. For example, since the location of the apparatus for transmitting power wirelessly 100 can be specified, the application server 400 identifies an apparatus for transmitting power wirelessly 100 close enough to the mobile terminal 300 to be accessed by the mobile terminal 300, and determines the specified location of the apparatus for transmitting power wirelessly 100 as the location of the mobile terminal 300.

The application server 400 provides a location service related to the determined location of the mobile terminal 300 to the mobile terminal 300 or the apparatus for transmitting power wirelessly 100. Alternatively, the application server 400 identifies a user of the mobile terminal 300 to provide a user-customized service to the mobile terminal 300 or the apparatus for transmitting power wirelessly 100.

Next, various examples of a location-based service system will be described with reference to various drawings. In the various examples described below, descriptions of contents overlapping with or corresponding to each other will be omitted in order to avoid repetitive descriptions.

FIGS. 2 through 6 illustrate various examples of a location-based service system.

Figure 2:
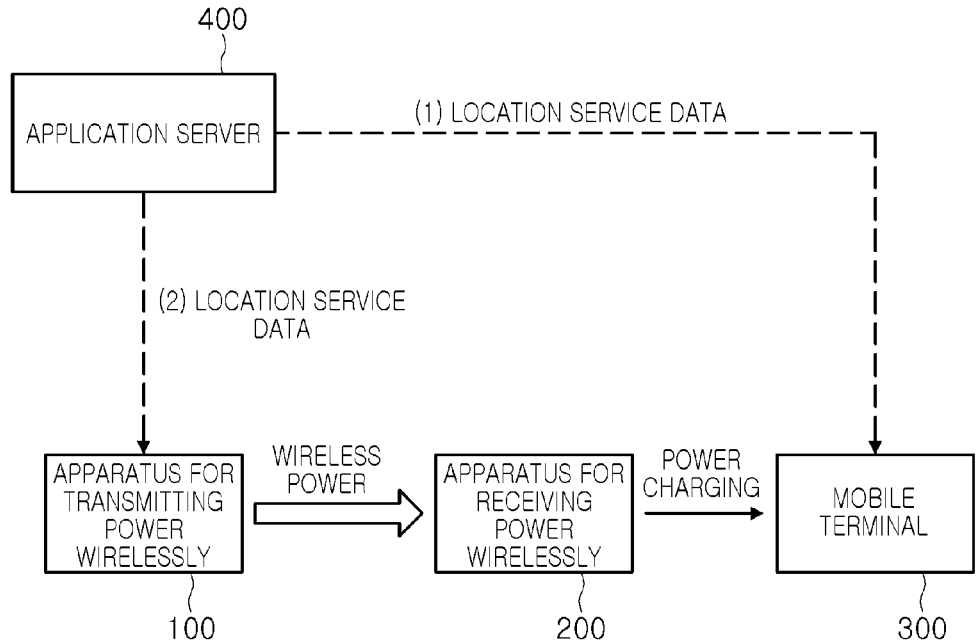
FIGS. 2 through 6 illustrate various examples of a location-based service system.

FIG. 2 illustrates an example of a location-based service system.

The apparatus for transmitting power wirelessly 100 wirelessly transmits power to the apparatus for receiving power wirelessly 200. In one example, the apparatus for transmitting power wirelessly 100 authenticates the apparatus for receiving power wirelessly 200 or the mobile terminal 300 and then wirelessly transmits power to the apparatus for receiving power wirelessly 200 or the mobile terminal 300.

The apparatus for receiving power wirelessly 200 wirelessly receives power transmitted by the apparatus for transmitting power wirelessly 100 and charges the mobile terminal 300 using the power received wirelessly. For example, the apparatus for receiving power wirelessly 200 may be a component of the mobile terminal 300 or a separate apparatus that is coupled to the mobile terminal 300.

The mobile terminal 300 receives the power received by the apparatus for receiving power wirelessly 200.

The application server 400 identifies the location of the apparatus for transmitting power wirelessly 100 to identify the location of the mobile terminal 300 and provide the location-based service using the identified location. In one example, the application server 400 provides location service data to the mobile terminal 300 or the apparatus for transmitting power wirelessly 100.

In one example, the application server 400 provides user-customized service data using user information regarding the mobile terminal 300. The application server 400 provides the user-customized service data to the mobile terminal 300 or the apparatus for transmitting power wirelessly 100.

The location-based service transmitted by the application server 400 is not limited to any particular type of service. For example, the application server 400 provides an advertisement, a coupon, or other offer associated with the location of the mobile terminal 300 as the location-based service. As another example, the application server 400 may provide a discount or a free service for the use of the apparatus for transmitting power wirelessly 100 related to a corresponding location as the location-based service.

In addition, the location-based service may include service data that is unrelated to the location. For example, although the user-customized service data may not have a correlation with the location of the user, the user-customized service data may be included in the location service data. Therefore, in one example, the location service data includes the user-customized service data as well as the location-based service data.

Next, examples of various applications of the location-based service system will be described with reference to FIGS. 3 through 6.

Figure 3:
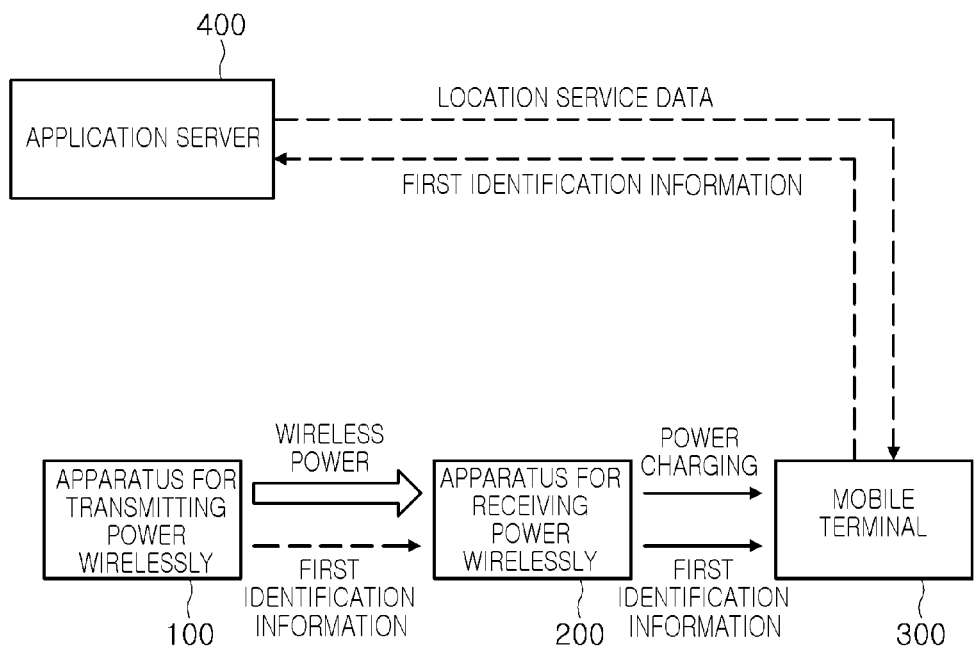

FIG. 3 illustrates another example of a location-based service system.

In the example illustrated in FIG. 3, the apparatus for transmitting power wirelessly 100 does not include a separate communications network that can be externally connected to the Internet and does not include a short distance communications transceiver that can communicate with the mobile terminal 300.

In one example, the apparatus for transmitting power wirelessly 100 performs an authentication for wireless charging. For example, in a state in which the apparatus for receiving power wirelessly 200 is being charged by the apparatus for transmitting power wirelessly 100, for example, in a case in which the apparatus for receiving power wirelessly 200 is located at a distance at which it may be charged by the apparatus for transmitting power wirelessly 100, the apparatus for transmitting power wirelessly 100 performs the authentication for wireless charging of the apparatus for receiving power wirelessly 200 or the mobile terminal 300.

In one example, in order to perform the authentication, the mobile terminal 300 provides authentication information regarding the mobile terminal 300 to the apparatus for receiving power wirelessly 200. For example, when an application for wireless charging is installed in the mobile terminal 300, the application stores the authentication information regarding the mobile terminal 300 in a memory of the apparatus for receiving power wirelessly 200. The apparatus for receiving power wirelessly 200 provides the stored authentication information regarding the mobile terminal 300 to the apparatus for transmitting power wirelessly 100. The apparatus for transmitting power wirelessly 100 authenticates the mobile terminal 300 using the authentication information regarding the mobile terminal 300 and wirelessly transmits power to the apparatus for receiving power wirelessly 200 when the mobile terminal 300 is successfully authenticated.

In one example, the authentication information regarding the mobile terminal 300 includes identification information regarding a wireless communications service provider providing a wireless communications service to the mobile terminal 300, and the apparatus for receiving power wirelessly 200 authenticates an authority for the wireless charging of the mobile terminal 300 using the identification information regarding the wireless communications service provider.

In another example, the apparatus for receiving power wirelessly 200 stores authentication information regarding the apparatus for receiving power wirelessly 200, and the apparatus for transmitting power wirelessly 100 authenticates an authority for the wireless charging of the mobile terminal 300 using the authentication information regarding the apparatus for receiving power wirelessly 200. For example, the authentication information regarding the apparatus for receiving power wirelessly 200 includes identification information regarding a wireless communications service provider providing a wireless communications service to the mobile terminal 300, and the apparatus for transmitting power wirelessly 100 determines whether or not power should be transmitted wirelessly using the identification information regarding the wireless communications service provider included in the authentication information regarding the apparatus for receiving power wirelessly 200.

The apparatus for transmitting power wirelessly 100 wirelessly transmits power to the apparatus for receiving power wirelessly 200 and provides first identification information allocated to the apparatus for transmitting power wirelessly 100 to the apparatus for receiving power wirelessly 200.

The first identification information allocated to the apparatus for transmitting power wirelessly 100 is used to identify the location of the apparatus for transmitting power wirelessly 100. In addition, the identified location of the apparatus for transmitting power wirelessly 100 is used as the location of the mobile terminal 300.

The apparatus for receiving power wirelessly 200 provides the first identification information allocated to the apparatus for transmitting power wirelessly 100 to the mobile terminal 300, and the mobile terminal 300 provides the first identification information allocated to the apparatus for transmitting power wirelessly 100 to the application server 400.

The application server 400 identifies a location of the apparatus for transmitting power wirelessly 100 using the identification information allocated to the apparatus for transmitting power wirelessly 100 and determines the location of the apparatus for transmitting power wirelessly 100 as the location of the mobile terminal 300. The application server 400 provides location service data associated with the location of the mobile terminal 300 to the mobile terminal 300. For example, the application server 400 provides downloadable contents such as a coupon, non-accounting authentication information, an advertisement, or other information associated with the location of the mobile terminal 300.

In one example, the mobile terminal 300 provides second identification information allocated to the mobile terminal 300, together with the first identification information, to the application server 400. For example, the second identification information allocated to the mobile terminal 300 may include an international mobile station equipment identity (IMEI), a subscriber identity module (SIM) code, a phone number, or other information allocated to the mobile terminal 300.

The second identification information allocated to the mobile terminal 300 may be used to determine a user-customized service. For example, the application server 400 determines the location of the mobile terminal 300 using the first identification information and determines whether or not a location service for the mobile terminal 300 is to be transmitted, a grade of the service, a kind of the service, and other characteristics of the service, using the second identification information.

In one example, when the wireless charging is completed in the mobile terminal 300, the mobile terminal 300 provides charging completion information to the application server 400. The application server 400 may change or end the provision of the service data depending on whether or not the wireless charging is completed.

Figure 4:
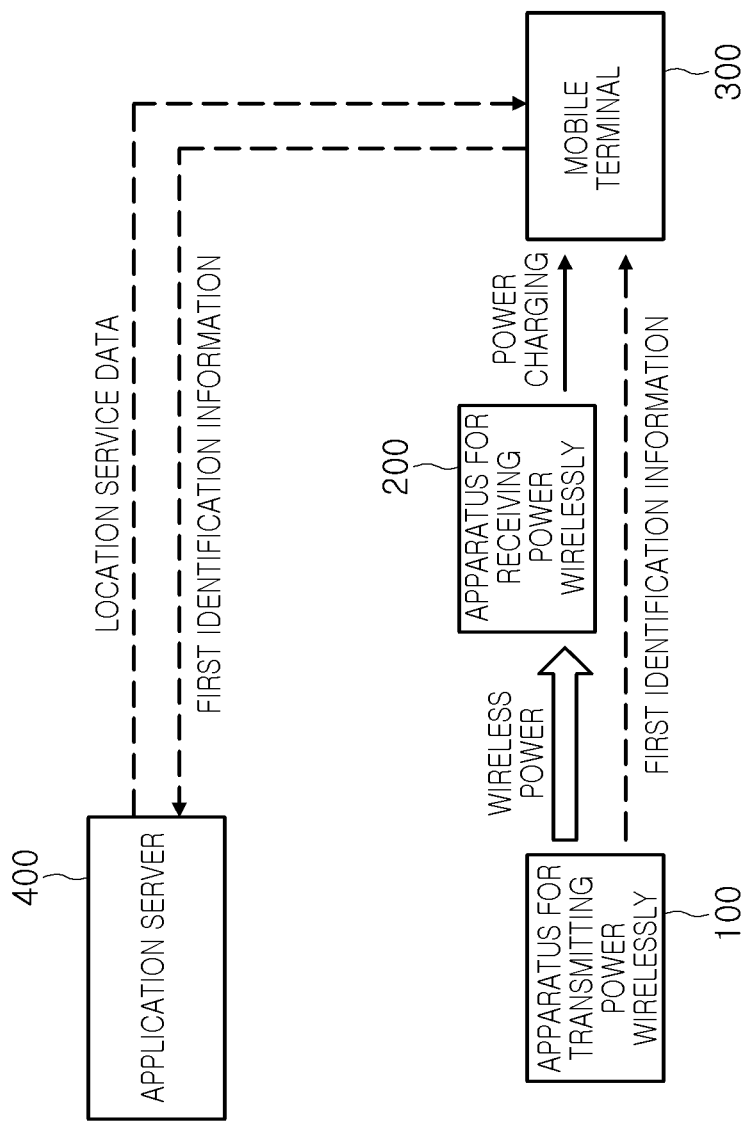

FIG. 4 illustrates another example of a location-based service system.

In the example illustrated in FIG. 4, the apparatus for transmitting power wirelessly 100 includes a short distance wireless communications transceiver so that short distance communication may be performed directly with the mobile terminal 300.

Referring to FIG. 4, the apparatus for transmitting power wirelessly 100 and the mobile terminal 300 communicate with each other using a short distance wireless communications transceiver, for example, a Bluetooth transceiver, or any other short distance wireless communications transceiver known to one of ordinary skill in the art. The apparatus for transmitting power wirelessly 100 provides the first identification information allocated to the apparatus for transmitting power wirelessly 100 to the mobile terminal 300 using short distance wireless communication.

The mobile terminal 300 provides the first identification information to the application server 400.

As described above, the first identification information allocated to the apparatus for transmitting power wirelessly 100 may be used to determine a location of the mobile terminal 300. For example, the application server 400 identifies the location of the apparatus for transmitting power wirelessly 100 using the first identification information, determines the identified location as the location of the mobile terminal 300, and provides location service data associated with the identified location to the mobile terminal 300 or the apparatus for transmitting power wirelessly 100.

In one example, the apparatus for transmitting power wirelessly 100 performs an authentication for the wireless charging using the apparatus for receiving power wirelessly 200 or the mobile terminal 300 and wirelessly transmits power to the apparatus for receiving power wirelessly 200 when the authentication is successfully performed. Since the authentication has been described above with reference to FIG. 3, a description of the authentication will be omitted here to avoid a repeated description.

Figure 5:
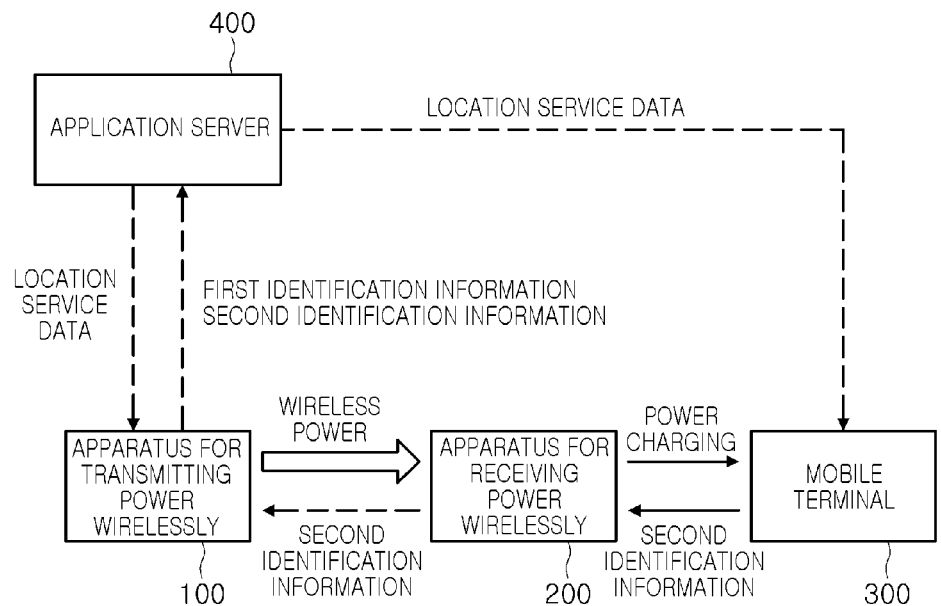

FIG. 5 illustrates another example of a location-based service system.

In the example illustrated in FIG. 5, the apparatus for transmitting power wirelessly 100 includes a wireless communications transceiver that can be externally connected to the Internet to enable direct communicate with the application server 400 to be performed.

Referring to FIG. 5, the apparatus for transmitting power wirelessly 100 wirelessly transmits power to the apparatus for receiving power wirelessly 200. In one example, the apparatus for transmitting power wirelessly 100 performs an authentication for wireless charging.

The apparatus for transmitting power wirelessly 100 provides the first identification information allocated to the apparatus for transmitting power wirelessly 100 to the application server 400 using a wireless communications network.

In one example, the apparatus for transmitting power wirelessly 100 provides the second identification information allocated to the mobile terminal 300 together with the first identification information allocated to the apparatus for transmitting power wirelessly 100 to the application server 400.

The application server 400 identifies the location of the mobile terminal 300 using the first identification information allocated to the apparatus for transmitting power wirelessly 100, and provides the location-based service using the identified location to the mobile terminal 300 or the apparatus for transmitting power wirelessly 100.

In one example, the application server 400 provides the location service data to the apparatus for transmitting power wirelessly 100 or the mobile terminal 300.

In one example, the application server 400 receives the first identification information allocated to the apparatus for transmitting power wirelessly 100 from the apparatus for transmitting power wirelessly 100, and determines the location service data using the first identification information. The application server 400 provides the determined location service data to the apparatus for transmitting power wirelessly 100. In this example, the location service data may also be determined without the second identification information allocated to the mobile terminal 300.

In another example, the application server 400 receives the first identification information allocated to the apparatus for transmitting power wirelessly 100 from the apparatus for transmitting power wirelessly 100 and the second identification information allocated to the mobile terminal 300. The application server 400 identifies the location of the mobile terminal 300 using the first identification information and determines the location service data using the second identification information. The application server 400 provides the determined location service data to the mobile terminal 300 or the apparatus for transmitting power wirelessly 100.

Figure 6:
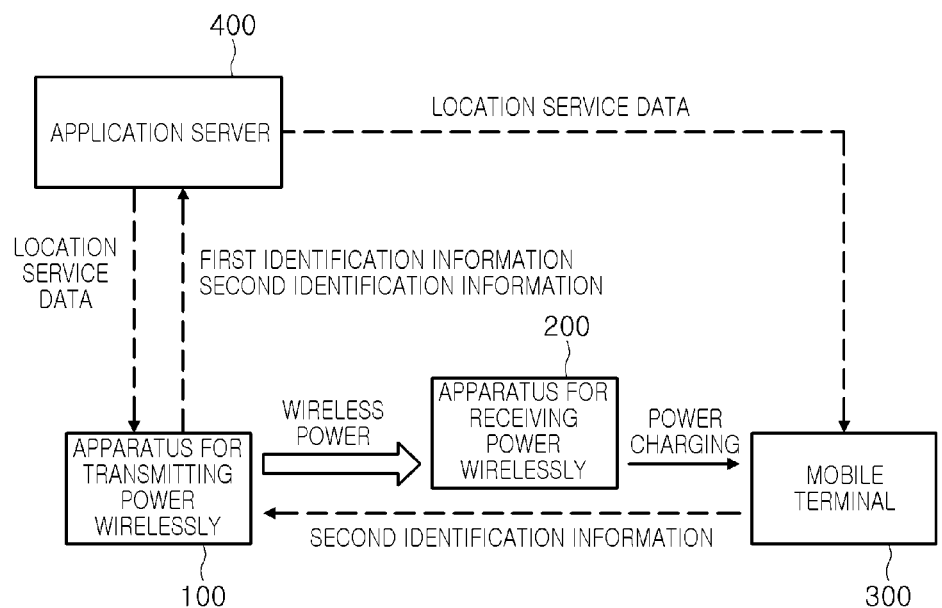

FIG. 6 illustrates another example of a location-based service system.

In the example illustrated in FIG. 6, the apparatus for transmitting power wirelessly 100 includes both the wireless communications transceiver that can be externally connected to the Internet and the short distance communications transceiver so that the apparatus for transmitting power wirelessly 100 may perform direct communication with the application server 400 and the mobile terminal 300.

Referring to FIG. 6, the apparatus for transmitting power wirelessly 100 wirelessly transmits power to the apparatus for receiving power wirelessly 200. In one example, the apparatus for transmitting power wirelessly 100 performs an authentication for wireless charging.

The apparatus for transmitting power wirelessly 100 directly obtains the second identification information allocated to the mobile terminal 300 from the mobile terminal 300 using short distance wireless communication.

The apparatus for transmitting power wirelessly 100 provides the first identification information allocated to the apparatus for transmitting wirelessly 100 and the second identification information to the application server 400.

The application server 400 determines the location service data using the first identification information and the second identification information and provides the determined location service data to the apparatus for transmitting power wirelessly 100 or the mobile terminal 300.

Various examples of the location-based service system transmitting the location service using the identification information allocated to the apparatus for transmitting power wirelessly 100 have been described above with reference to FIGS. 2 through 6.

In FIGS. 2 through 6, examples in which the first identification information allocated to the apparatus for transmitting power wirelessly 100 or the second identification information allocated to the mobile terminal 300 is used have been described.

In addition, third identification information allocated to the apparatus for receiving power wirelessly 200 may also be used in the various examples described above. For example, an authentication using the third identification information allocated to the apparatus for receiving power wirelessly 200, a mutual authentication, or other types of authentication may be performed.

For example, the apparatus for transmitting power wirelessly 100 provides the first identification information and the third identification information to the application server 400, and the mobile terminal 300 provides the second identification information and the third identification information to the application server 400. The application server 400 may confirms the apparatus for transmitting power wirelessly 100 associated with the mobile terminal 300 using the third identification information. In addition, the application server 400 determines the location of the mobile terminal 300 using the first identification information. Alternatively, the application server 400 authenticates the mobile terminal 300 or confirms the user-customized information of the mobile terminal 300 using the second identification information.

Next, various examples of an apparatus will be described with reference to FIGS. 7 through 19.

FIGS. 7 through 12 illustrate various examples of an apparatus for transmitting power wirelessly.

Figure 7:
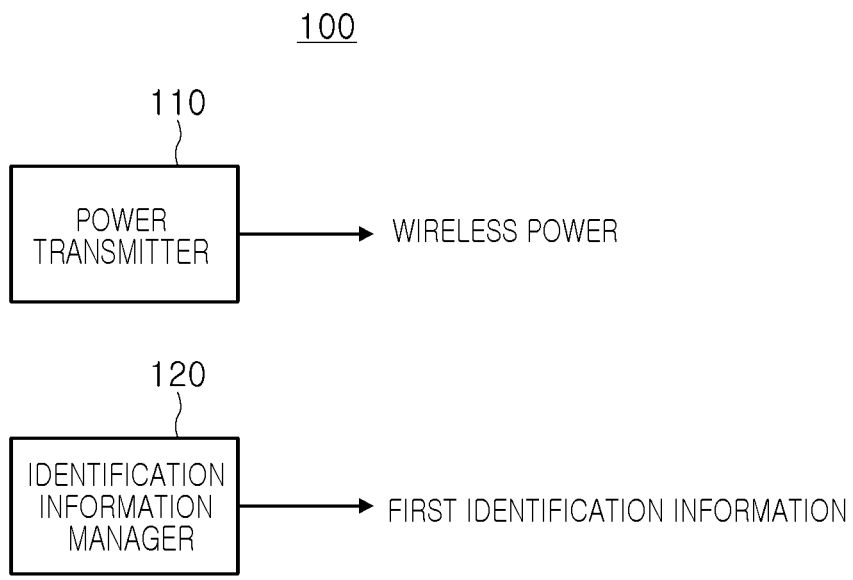

FIG. 7 illustrates an example of an apparatus for transmitting power wirelessly.

Referring to FIG. 7, the apparatus for transmitting power wirelessly 100 includes a power transmitter 110 and an identification information manager 120.

The power transmitter 110 wirelessly transmits power to the apparatus for receiving power wirelessly 200.

The identification information manager 120 provides the first identification information allocated to the apparatus for transmitting power wirelessly 100 to other devices. In one example, the identification information manager 120 directly or indirectly provides the first identification information to one or more of the apparatus for receiving power wirelessly 200, the mobile terminal 300, and the application server 400.

The first identification information is associated with zone information regarding a zone in which the apparatus for transmitting power wirelessly 100 is located. For example, the application server 400 associates the first identification information and location information of a corresponding apparatus for transmitting power wirelessly 100 with each other and stores the associated information. This makes it possible to use the location information of the apparatus for transmitting power wirelessly 100 to identify the location of the mobile terminal 300 since the apparatus for transmitting power wirelessly 100 is fixed in a specific zone.

Figure 8:
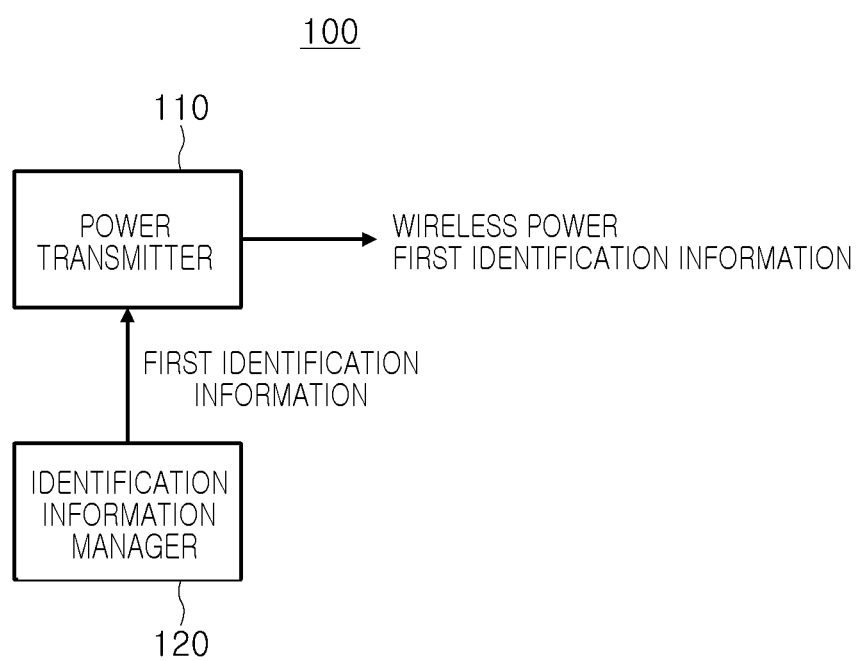

FIG. 8 illustrates another example of an apparatus for transmitting power wirelessly.

In the example illustrated in FIG. 8, the first identification information allocated to the apparatus for transmitting power wirelessly 100 is transmitted to other devices using a wireless power communications scheme. For example, the identification information manager 120 provides the first identification information allocated to the apparatus for transmitting power wirelessly 100 to the power transmitter 110, and the power transmitter 110 transmits the first identification information according to a wireless power communications standard to provide the first identification information to other devices.

For example, the power transmitter 110 may use a unique identifier of the wireless power communications standard as the first identification information.

FIG. 9 illustrates an example of a configuration of a packet used to set a protocol for transmitting power wirelessly in the power transmitting apparatus. The example of FIG. 8 will be described with reference to FIG. 9.

In FIG. 9, Manufacturer Code denotes a manufacturer code, and Basic Device Identifier denotes a unique identifier of a corresponding apparatus. For example, since the unique identifier of the corresponding apparatus, for example, the apparatus for transmitting power wirelessly 100, is required in the packet used in the protocol for transmitting power wirelessly, the unique identifier of this packet may be used as the first identification information allocated to the apparatus for transmitting power wirelessly 100, and the first identification information may be transmitted to the apparatus for receiving power wirelessly 200 using the unique identifier of this packet.

Figure 10:
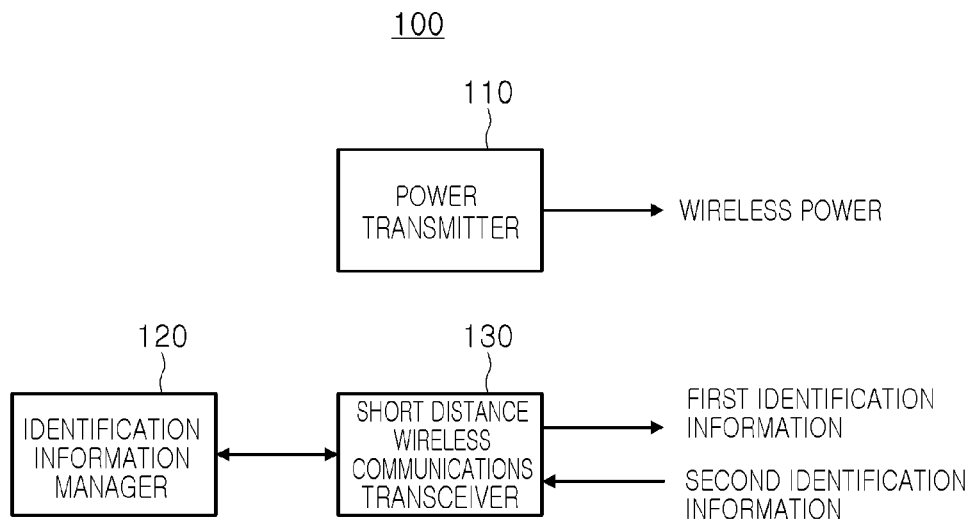

FIG. 10 illustrates another example of an apparatus for transmitting power wirelessly.

Referring to FIG. 10, the apparatus for transmitting power wirelessly 100 further includes a short distance wireless communications transceiver 130.

The short distance wireless communications transceiver 130 performs short distance wireless communications using a communications scheme such as a near field communications (NFC) scheme, a Bluetooth scheme, a WiFi scheme, a Zigbee scheme, or any other short distance wireless communications scheme known to one of ordinary skill in the art.

The short distance wireless communications transceiver 130 provides the first identification information allocated to the apparatus for transmitting power wirelessly 100 provided by the identification information manager 120 to an external apparatus, for example, the apparatus for receiving power wirelessly 200 or the mobile terminal 300.

In one example, the short distance wireless communications transceiver 130 receives the second identification information allocated to the mobile terminal 300. For example, the short distance wireless communications transceiver 130 receives the second identification information allocated to the mobile terminal 300 from the mobile terminal 300 or the apparatus for receiving power wirelessly 200 and then provides the second identification information to the identification information manager 120.

Figure 11:
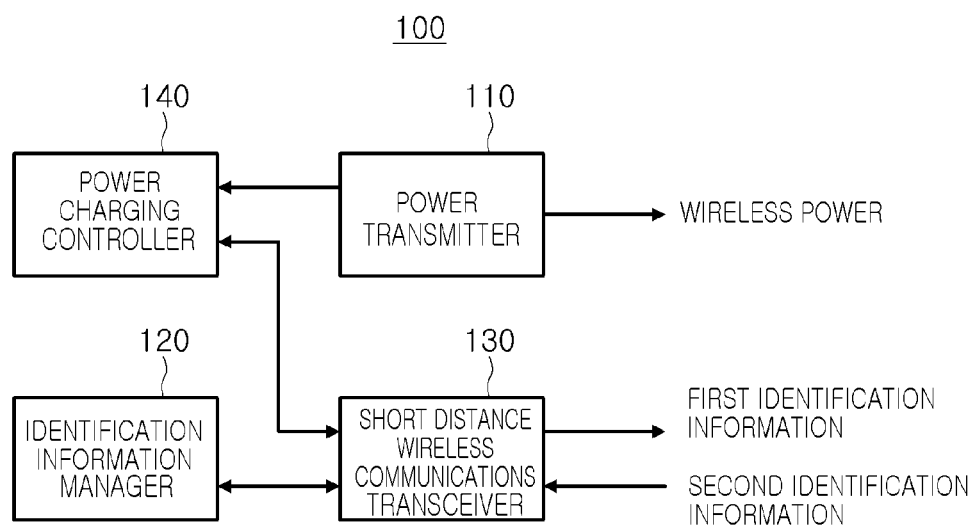

FIG. 11 illustrates another example of an apparatus for transmitting power wirelessly. In the example illustrated in FIG. 11, a predetermined authentication for transmitting power wirelessly is performed.

Referring to FIG. 11, the apparatus for transmitting power wirelessly 100 includes a power transmitter 110, an identification information manager 120, and a power charging controller 140. In the example illustrated in FIG. 11, the apparatus for transmitting power wirelessly 100 further includes a short distance wireless communications transceiver 130.

The power charging controller 140 authenticates an authority for wireless charging of the apparatus for receiving power wirelessly 200.

In one example, the power charging controller 140 performs the authentication using any one or any combination of communications service provider information of the mobile terminal 300 connected to the apparatus for receiving power wirelessly 200, terminal information of the mobile terminal 300, user information of the mobile terminal 300, and remaining power information of the mobile terminal 300.

For example, the power charging controller 140 may set the communications service provider information through which the wireless charging may be performed, and may confirm the communications service provider information of the mobile terminal 300 to authenticate whether or not the wireless charging is permitted to be performed. As another example, the power charging controller 140 may confirm the remaining power of the mobile terminal to determine whether or not power is to be transmitted wirelessly.

In one example, when the authority for wireless charging of the apparatus for receiving power wirelessly 200 is authenticated, the identification information manager 120 provides the first identification information allocated to the apparatus for transmitting power wirelessly 100 to the apparatus for receiving power wirelessly 200 or the mobile terminal 300. For example, the apparatus for transmitting power wirelessly 100 provides the location-based service when the authority for wireless charging is authenticated.

Figure 12:
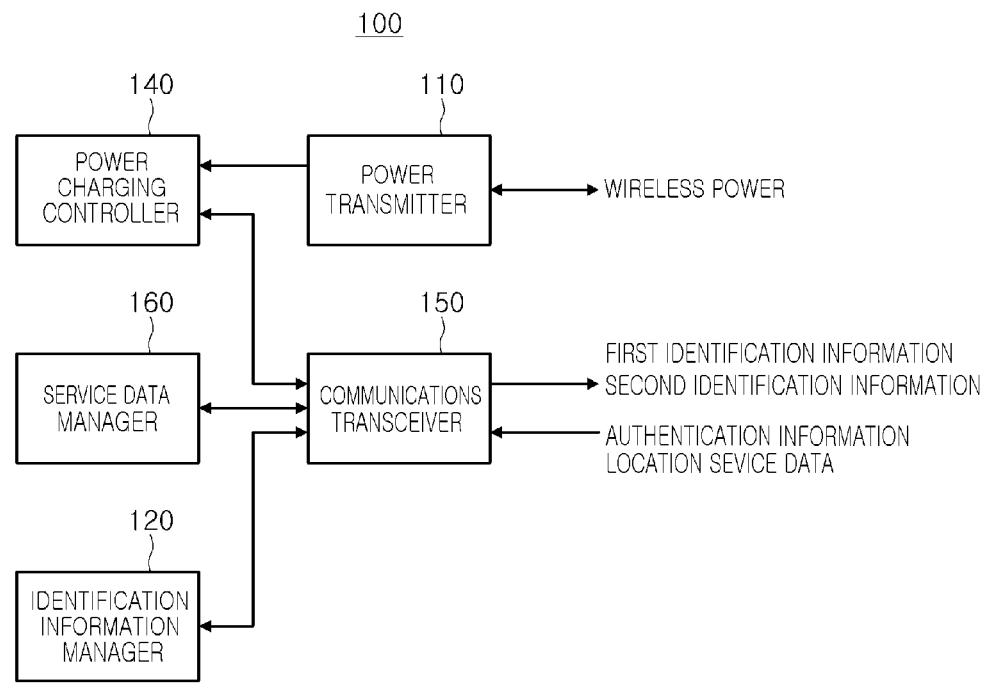

FIG. 12 illustrates another example of an apparatus for transmitting power wirelessly. In the example illustrated in FIG. 12, the apparatus for transmitting power wirelessly 100 communicates with the application server 400 using a communications transceiver 150.

Referring to FIG. 12, the apparatus for transmitting power wirelessly 100 includes a power transmitter 110, an identification information manager 120, a power charging controller 140, the communications transceiver 150, and a service data manager 160. Although not shown in FIG. 12, in one example, the apparatus for transmitting power wirelessly 100 further includes a short distance wireless communications transceiver.

The communications transceiver 150 is connected to the application server. The communications transceiver 150 may be connected to the application server using a wired network or a wireless network. The communications transceiver 150 receives information regarding the mobile terminal 300 and the location service data for transmitting the location-based service from the application server 400.

The power charging controller 140 cooperates with the application server 400 to perform authentication. For example, the power charging controller 140 determines an authority, a provision time, or other conditions of the wireless charging of the apparatus for receiving power wirelessly 200 using authentication information transmitted by the application server 400.

The service data manager 160 receives the location service data associated with a zone in which the apparatus for transmitting power wirelessly 100 is located from the application server 400 through the communications transceiver 150. The service data manager 160 provides the received location service data to the mobile terminal 300 using a short distance wireless communications transceiver, or displays the received location service data using a predetermined display. To this end, the apparatus for transmitting power wirelessly 100 may include a predetermined display.

The identification information manager 120 obtains the second identification information allocated to the mobile terminal 300 and provides the obtained second identification information allocated to the mobile terminal 300 to the application server 400 through the communications transceiver 150. In one example, the identification information manager 120 provides the second identification information allocated to the mobile terminal 300 together with the first identification information allocated to the apparatus for transmitting power wirelessly 100 to the application server 400 through the communications transceiver 150.

Figure 13:
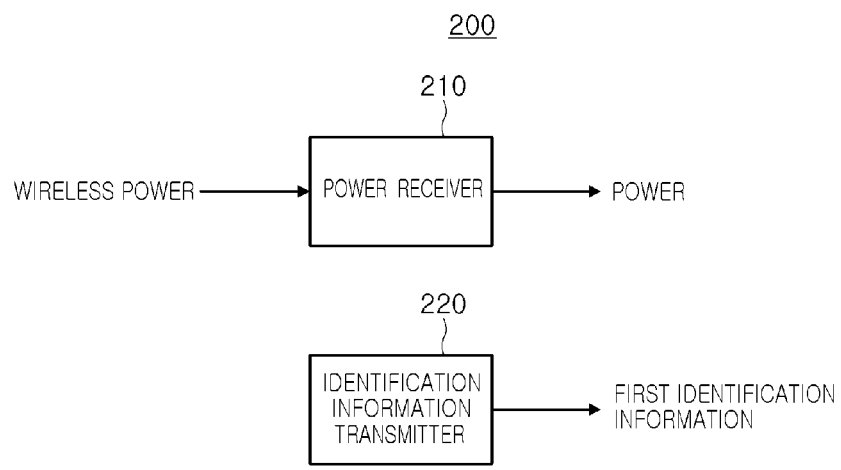
FIGS. 13 through 15 illustrate various examples of an apparatus for receiving power wirelessly.
Figure 14:
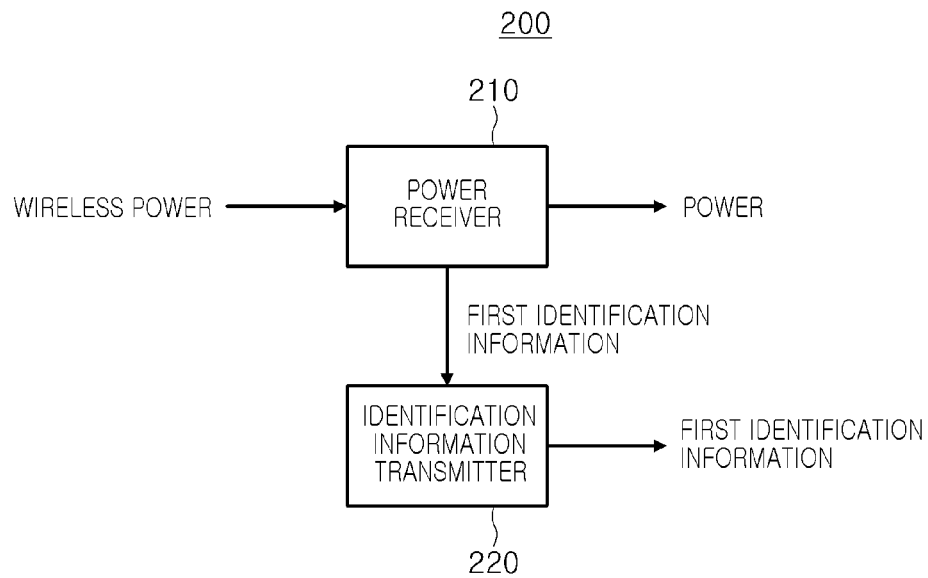
Figure 15:
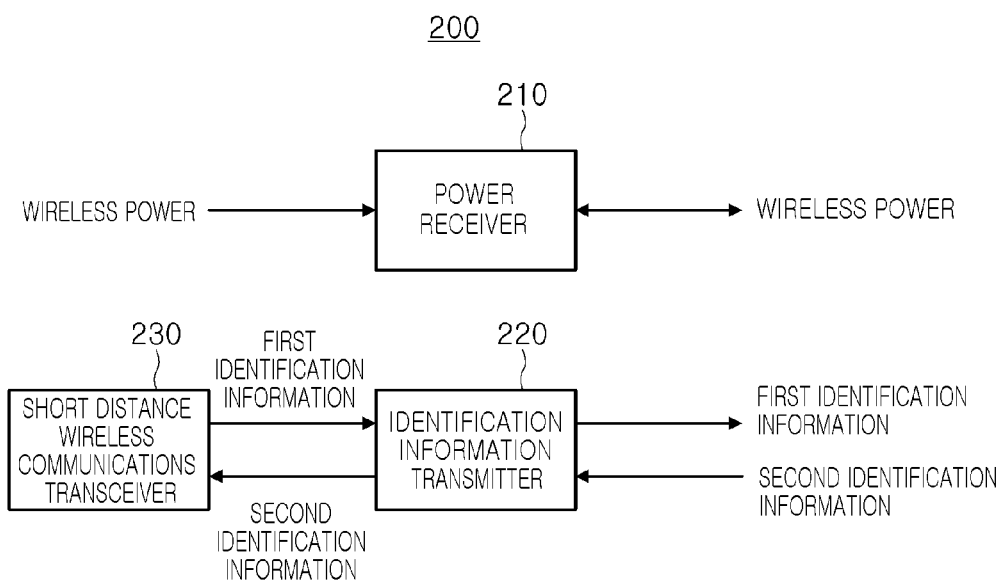

FIGS. 13 through 15 illustrate various examples of an apparatus for receiving power wirelessly.

FIG. 13 illustrates an example of an apparatus for receiving power wirelessly.

The apparatus for receiving power wirelessly 200 includes a power receiver 210 and an identification information transmitter 220.

The power receiver 210 wirelessly receives power transmitted by the apparatus for transmitting power wirelessly 100. The power receiver 210 is electrically connected to the mobile terminal 300, and provides the received power to the mobile terminal 300.

The identification information transmitter 220 transmits the identification information between the apparatus for transmitting power wirelessly 100 and the mobile terminal 300.

In one example, the identification information transmitter 220 receives the first identification information allocated to the apparatus for transmitting power wirelessly 100 from the apparatus for transmitting power wirelessly 100 and transmits the first identification information to the mobile terminal 300.

In one example, the identification information transmitter 220 receives the second identification information allocated to the mobile terminal 300 from the mobile terminal 300 and transmits the second identification information to the apparatus for transmitting power wirelessly 100.

FIG. 14 illustrates another example of an apparatus for receiving power wirelessly. In the example of FIG. 14, the first identification information allocated to the apparatus for transmitting power wirelessly 100 is obtained using a scheme of receiving power wirelessly.

Referring to FIG. 14, the apparatus for receiving power wirelessly 200 wirelessly transmits power according to a specific scheme of transmitting power wirelessly, which may be a preset transmitting and receiving protocol. For example, as described above with reference to FIG. 8, in the transmitting and receiving protocol for transmitting power wirelessly, the unique identifier for identifying the apparatus for transmitting power wirelessly 100 is used, and the identification information transmitter 220 provides the unique identifier of the apparatus for transmitting power wirelessly 100 for wireless transmission of power as the first identification information.

FIG. 15 illustrates another example of an apparatus for receiving power wirelessly. In the example of FIG. 15, the apparatus for receiving power wirelessly 200 includes a short distance wireless communications transceiver 230.

The identification information transmitter 220 receives the first identification information from the apparatus for transmitting power wirelessly 100 using the short distance wireless communications transceiver 230. The identification information transmitter 220 transmits the received first identification information to the mobile terminal 300.

The identification information transmitter 220 may obtain the second identification information allocated to the mobile terminal 300 from the mobile terminal 300 through the short distance wireless communications transceiver 230 or a separate communications transceiver. The identification information transmitter 220 transmits the obtained second identification information to the apparatus for transmitting power wirelessly 100.

Figure 16:
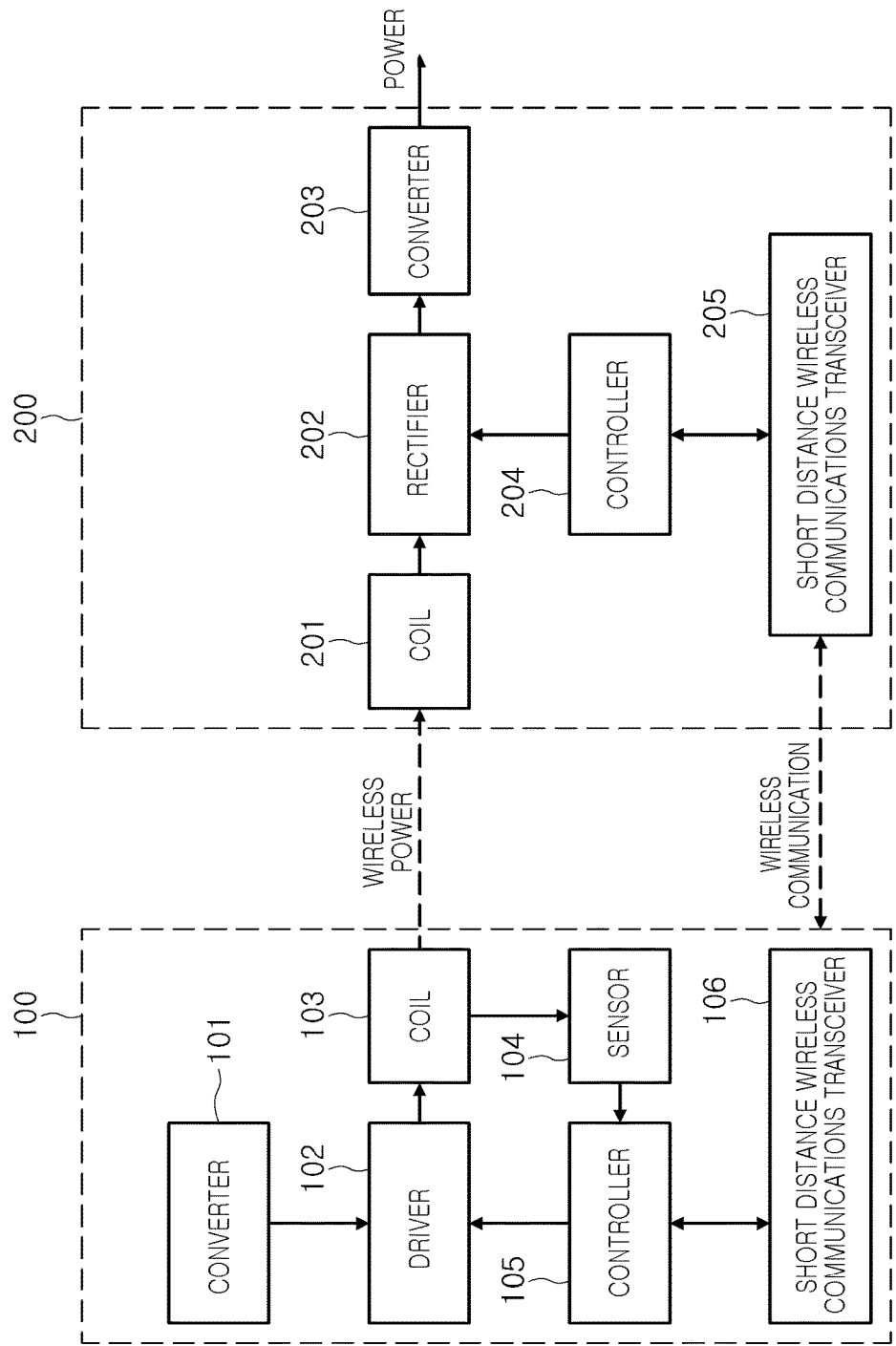
FIG. 16 illustrate examples of circuits that may be used in the apparatus for transmitting power wirelessly and the apparatus for receiving power wirelessly.

FIG. 16 illustrates examples of circuits that may be used in the apparatus for transmitting power wirelessly and the apparatus for receiving power wirelessly.

The apparatus for transmitting power wirelessly 100 includes a converter 101, a driver 102, a coil 103, and a controller 105. In one example, the apparatus for transmitting power wirelessly 100 may further include one or both of a sensor 104 and a short distance wireless communications transceiver 106.

The converter 101 converts power input externally. The converted voltage is amplified by the driver 102 and the amplified voltage is applied to the coil 103. The coil 103 of the apparatus for transmitting power wirelessly 100 couples with a coil 201 of the apparatus for receiving power wirelessly 200 to transmit power wirelessly.

The sensor 104 senses a state of the coil 103. The controller 105 controls the driver 102 to control the transmission of the power transmitted wirelessly.

The short distance wireless communications transceiver 106 communicates with a short distance wireless communications transceiver 205 of the apparatus for receiving power wirelessly 200 to wirelessly transmit and receive predetermined data. The controller 105 controls the short distance communications transceiver 106 to communicate with the short distance wireless communications transceiver 205.

The apparatus for receiving power wirelessly 200 includes the coil 201, a rectifier 202, a converter 203, and a controller 204. In one example, the apparatus for receiving power wirelessly 200 may further include the short distance wireless communications transceiver 205.

The coil 201 wirelessly receives power transmitted by the coil 103 of the apparatus for transmitting power wirelessly 100. The wirelessly received power is rectified by the rectifier 202, the rectifier power is converted by the converter 203, and the converted power is applied to the mobile terminal 300. The controller 204 controls the rectifier 202 to control the power applied to the mobile terminal 300, and controls the controls the short distance communications transceiver 205 to communicate with the short distance wireless communications transceiver 106 of the apparatus for transmitting power wirelessly 205.

The components described above with reference to FIGS. 7 through 15 may be combined with each other or may be separated from each other and be implemented in one or more integrated circuits. For example, the identification information manager 120, the power charging controller 140, and the service data manager 160 of the apparatus for transmitting power wirelessly 100 in FIG. 12 may be implemented by one integrated circuit corresponding to the controller 105 in FIG. 16. Alternatively, the identification information manager 120, the power charging controller 140, and the service data manager 160 of the apparatus for transmitting power wirelessly 100 in FIG. 12 may be implemented by separate respective integrated circuits, or some of the functions thereof may be implemented by software.

Figure 17:
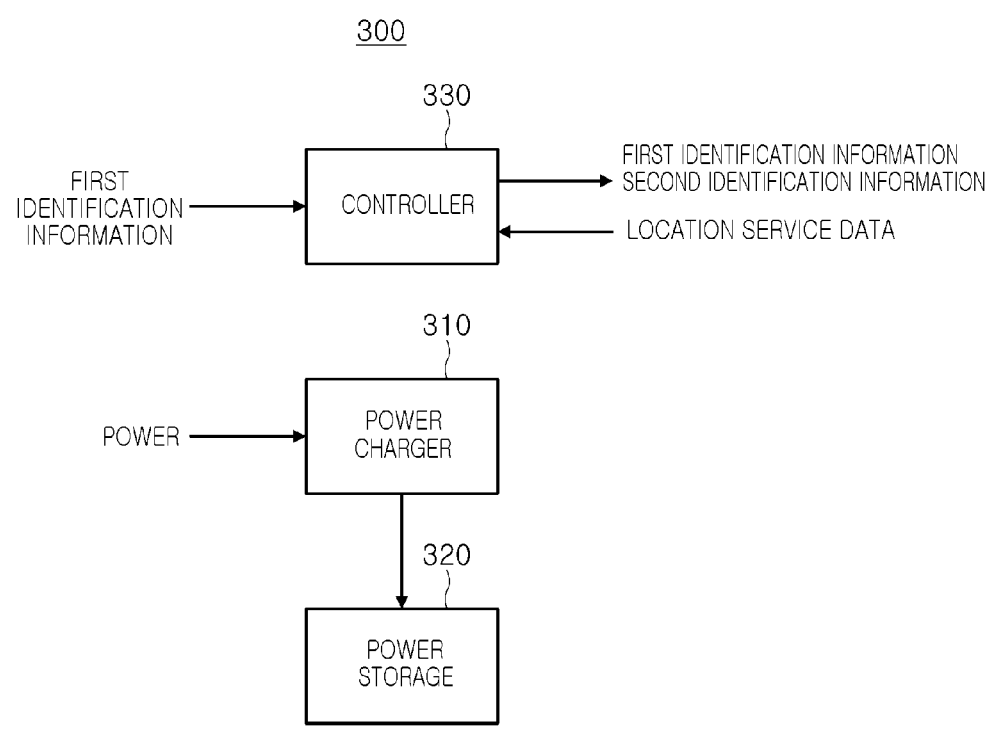
FIGS. 17 and 18 illustrate various examples of a mobile terminal.
Figure 18:
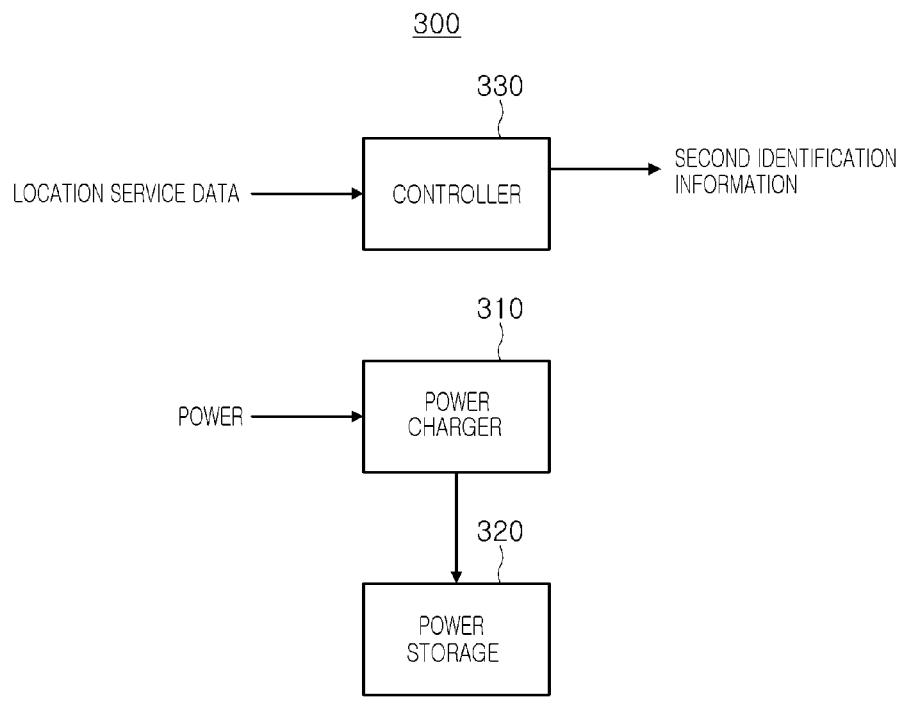

FIGS. 17 and 18 illustrate various examples of a mobile terminal.

FIG. 17 illustrates an example of a mobile terminal.

Referring to FIG. 17, the mobile terminal 300 includes a power charger 310, a power storage 320, and a controller 330.

The power charger 310 is connected to the apparatus for receiving power wirelessly 200 to receive power from the apparatus for receiving power wirelessly 200. The power charger 310 stores the power received from the apparatus for receiving power wirelessly 200 in the power storage 320, which may be, for example, a rechargeable battery of the mobile terminal 300.

The controller 330 obtains the first identification information allocated to the apparatus for transmitting power wirelessly 100 and transmits either one or both of the second identification information allocated to the mobile terminal 300 and the first identification information to the application server 400. The first identification information is associated with the zone information regarding the zone in which the apparatus for transmitting power wirelessly is located.

The controller 330 receives location service data associated with a zone in which the mobile terminal 300 is located from the application server 400.

FIG. 18 illustrates another example of a mobile terminal.

In the example illustrated in FIG. 18, the mobile terminal 300 receives location service data from the apparatus for transmitting power wirelessly 100.

In detail, the controller 330 transmits the identification information allocated to the mobile terminal 300 to the apparatus for transmitting power wirelessly 100. The apparatus for transmitting power wirelessly 100 transmits the identification information allocated to the mobile terminal 300 to the application server 400 and receives the location service data associated with the zone in which the mobile terminal is located. The controller 330 receives the location service data from the apparatus for transmitting power wirelessly 100.

Although not illustrated in FIGS. 17 and 18, the mobile terminal 300 may directly or indirectly communicate with the apparatus for transmitting power wirelessly 100 or the application server 400 using a short distance wireless communications transceiver or a wireless communications transceiver.

The components of the mobile terminal described above may also be implemented by an application that is executed in the mobile terminal 300.

In one example, the application is an application that is executed in the mobile terminal 300, and includes a function of obtaining the first identification information allocated to the apparatus for transmitting power wirelessly 100, a function of managing the second identification information allocated to the mobile terminal 300, and a function of transmitting either one or both of the first identification information and the second identification information to other devices.

In one example, the application may further execute a function of receiving the location service data associated with a location of the mobile terminal 300 and displaying the received location service data.

Figure 19:
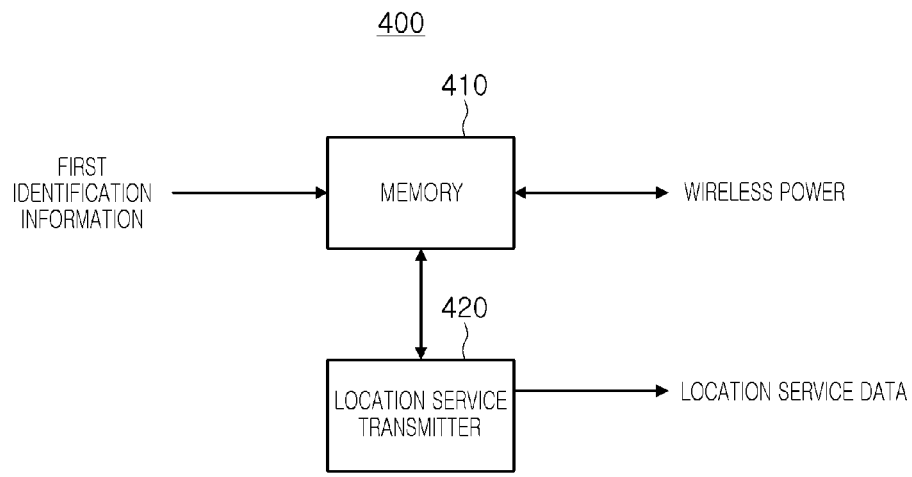
FIG. 19 illustrates an example of an application server.

FIG. 19 illustrates an example of an application server.

Referring to FIG. 19, the application server 400 includes a memory 410 and a location service transmitter 420. Although not shown, the application server 400 may include a communications transceiver that may be connected to the mobile terminal 300 or the apparatus for transmitting power wirelessly 100.

The memory 410 stores location data in which the first identification information allocated to the apparatus for transmitting power wirelessly 100 and zone information regarding a zone in which the apparatus for transmitting power wirelessly 100 is located are associated with each other.

In one example, the memory 410 stores user information regarding a user of the mobile terminal. For example, the memory 410 associates the identification information allocated to the mobile terminal 300 and the user information regarding the mobile terminal 300 with each other and stores the associated information.

The location service transmitter 420 determines the location of the mobile terminal 300 receiving power from the apparatus for transmitting power wirelessly 100 using the location data.

In one example, the location service transmitter 420 confirms the first identification information allocated to the apparatus for transmitting power wirelessly 100 and the second identification information allocated to the mobile terminal 300 to determine the zone in which the apparatus for transmitting power wirelessly 100 is located as the location of the mobile terminal.

In one example, the location service transmitter 420 transmits the location service data associated with the determined location of the mobile terminal 300 to either one or both of the mobile terminal 300 or the apparatus for transmitting power wirelessly 100.

In one example, the location service transmitter 420 identifies the mobile terminal 300 and determines the service data using the user information associated with the identified mobile terminal 300. For example, the user information may include service use information, service preference information, communications service provider information, user grade information, and the like, of the user, and the location service transmitter 420 determines a kind of service data, a grade of service data, whether or not accounting is made for the service data, and the like, using the user information.

Various examples of the location-based service system and various examples of the components configuring the location-based service system have been described above.

Next, a location-based service method performed by the apparatuses of the location-based service system will be described in greater detail.

FIGS. 20 through 23 illustrate various examples of an authentication method performed to transmit power wirelessly.

Figure 20:
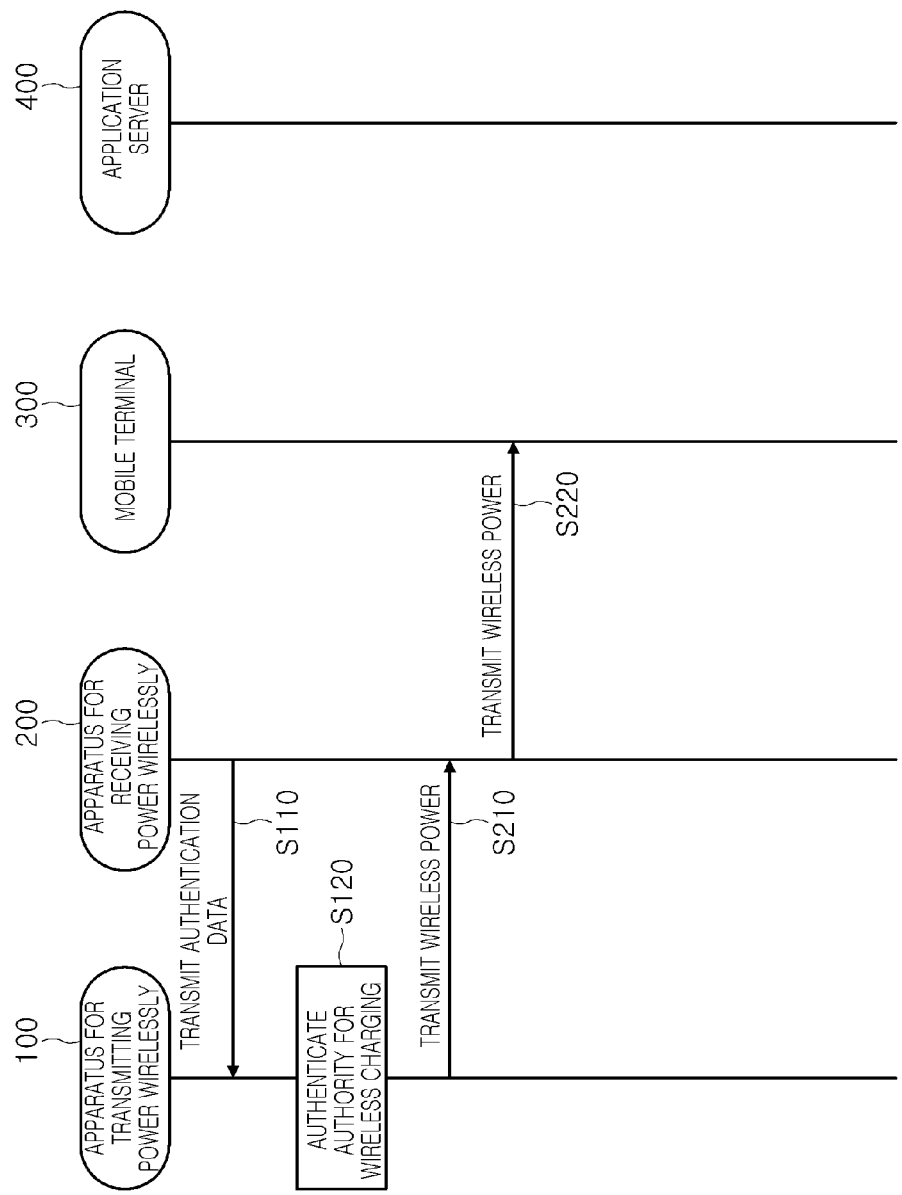
FIGS. 20 through 23 illustrate various examples of an authentication method performed to transmit power wirelessly.

FIG. 20 illustrates an example of an authentication method performed to transmit power wirelessly.

As illustrated in FIG. 20, the apparatus for transmitting power wirelessly 100 receives authentication data from the apparatus for receiving power wirelessly 200 (S110). The authentication data may be an identifier allocated to the apparatus for receiving power wirelessly 200 or authentication data transmitted by the mobile terminal 300 to the apparatus for receiving power wirelessly 200. In addition, the authentication data may be separate authentication data such as a personal barcode or other authentication data stored in the mobile terminal 300.

The apparatus for transmitting power wirelessly 100 authenticates an authority for wireless charging using the authentication data (S120). The authority for wireless charging is a broad concept including, for example, whether or not the apparatus for receiving power wirelessly 200 is a wireless charging target, whether or not an accounting is made at the time of performing wireless charging, and whether or not a predetermined limitation applies to the wireless charging.

The apparatus for transmitting power wirelessly 100 wirelessly transmits power to the apparatus for receiving power wirelessly 200 (S210) when the apparatus for receiving power wirelessly 200 is successfully authenticated. The apparatus for receiving power wirelessly 200 provides power to the mobile terminal 300 using the wirelessly received power (S220).

Figure 21:
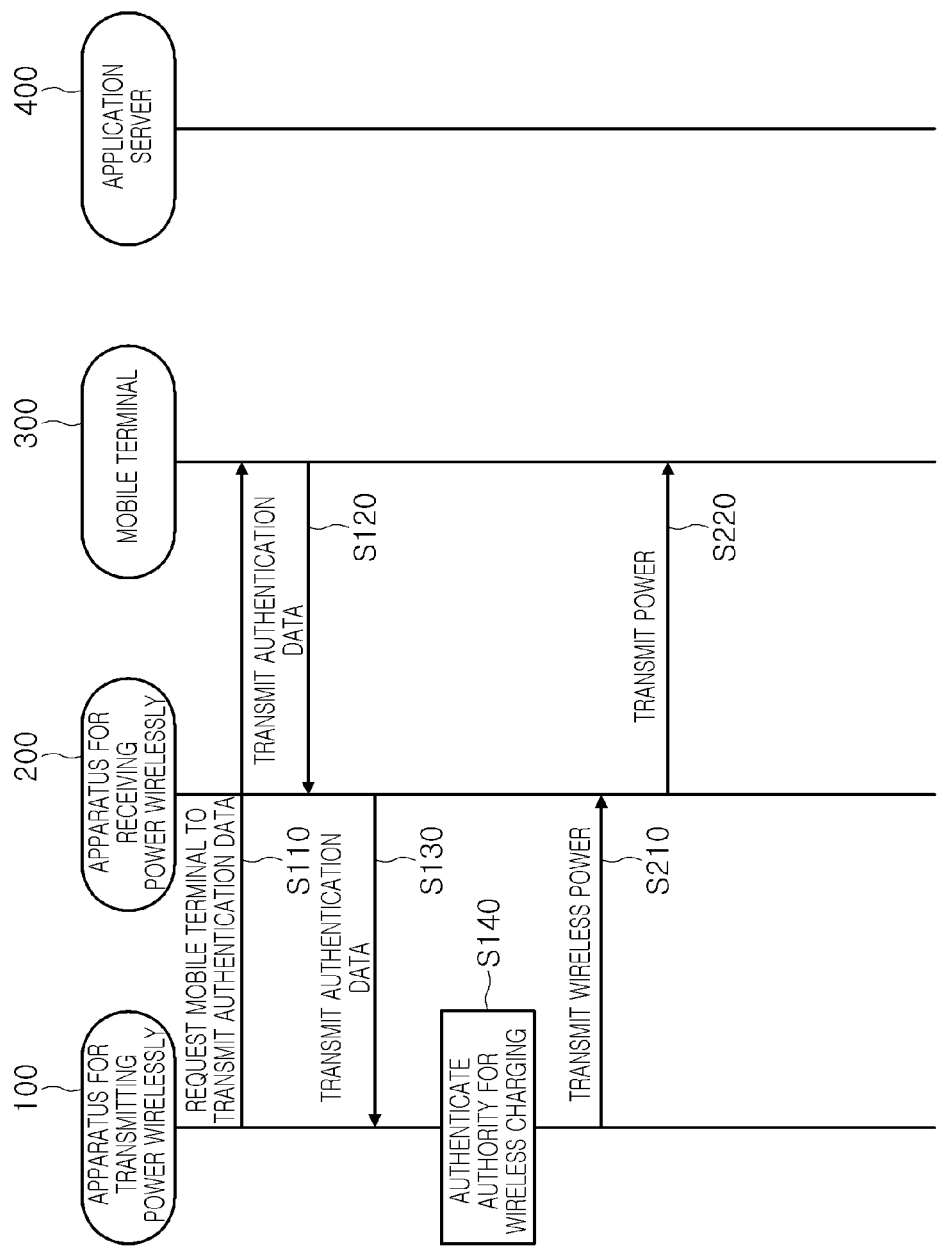
Figure 22:
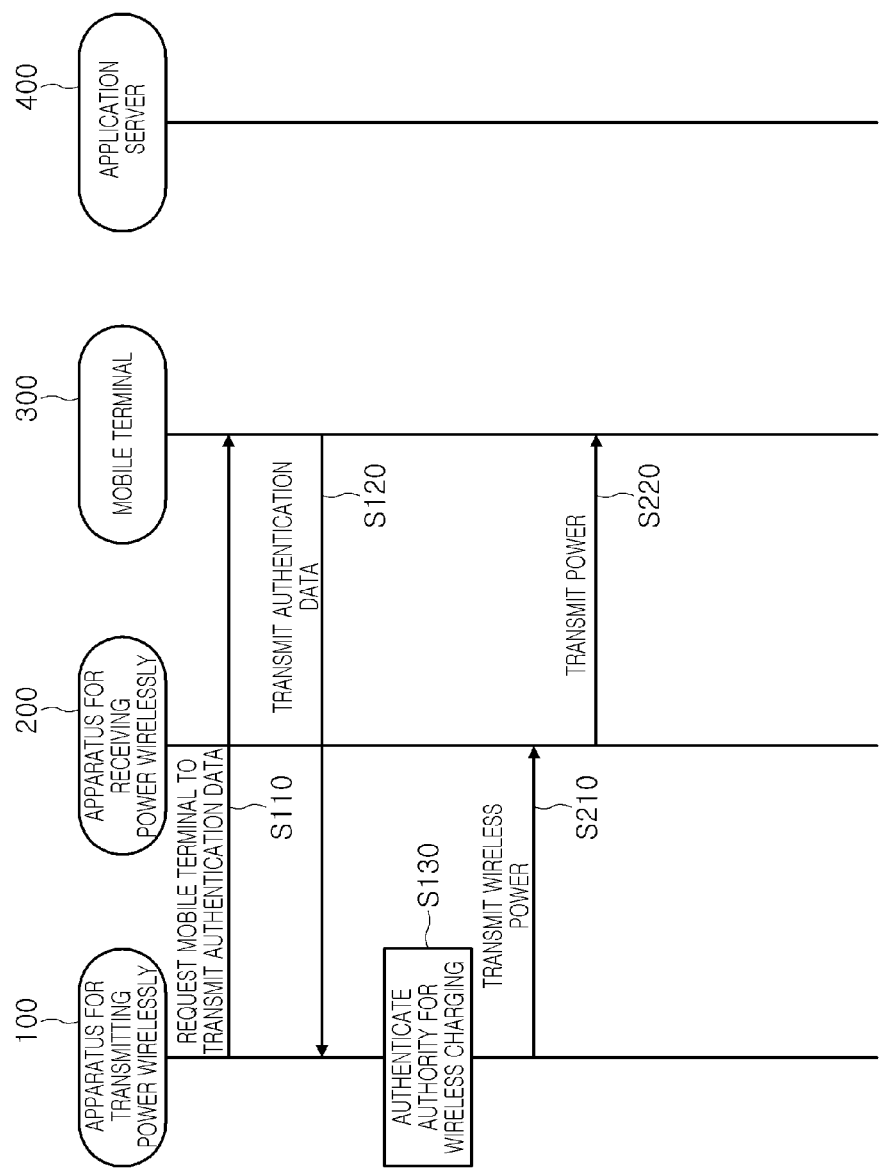

FIGS. 21 and 22 illustrate other examples of an authentication method performed to transmit power wirelessly.

In the authentication methods illustrated in FIGS. 21 and 22, the authentication is performed using the mobile terminal 300. However, procedures (S210) and (S220) after the authentication is performed correspond to the procedures described above with reference to FIG. 20.

The apparatus for transmitting power wirelessly 100 requests that the mobile terminal 300 transmit the authentication data (S110). To this end, the apparatus for transmitting power wirelessly 100 directly communicates with the mobile terminal 300 using a short distance wireless communications scheme or other communications scheme.

The mobile terminal 300 then transmits the authentication data to the apparatus for transmitting power wirelessly 100 either directly or indirectly via the apparatus for receiving power wirelessly 200.

In the example illustrated in FIG. 21, the mobile terminal 300 transmits the authentication data to the apparatus for receiving power wirelessly 200 (S120), and the apparatus for receiving power wirelessly 200 transmits the authentication data to the apparatus for transmitting power wirelessly 100 (S130). The apparatus for transmitting power wirelessly 100 and the apparatus for receiving power wirelessly 200 transmit and receive the authentication data according to a predetermined wireless power protocol. The apparatus for transmitting power wirelessly 100 authenticates an authority for wireless charging using the authentication data (S140).

In the example illustrated in FIG. 22, the mobile terminal 300 transmits the authentication data to the apparatus for transmitting power wirelessly 100 (S120). For example, the mobile terminal 300 and the apparatus for transmitting power wirelessly 100 directly communicate with each other using the short distance wireless communications scheme. The apparatus for transmitting power wirelessly 100 authenticates an authority for wireless charging using the authentication data (S130).

Figure 23:
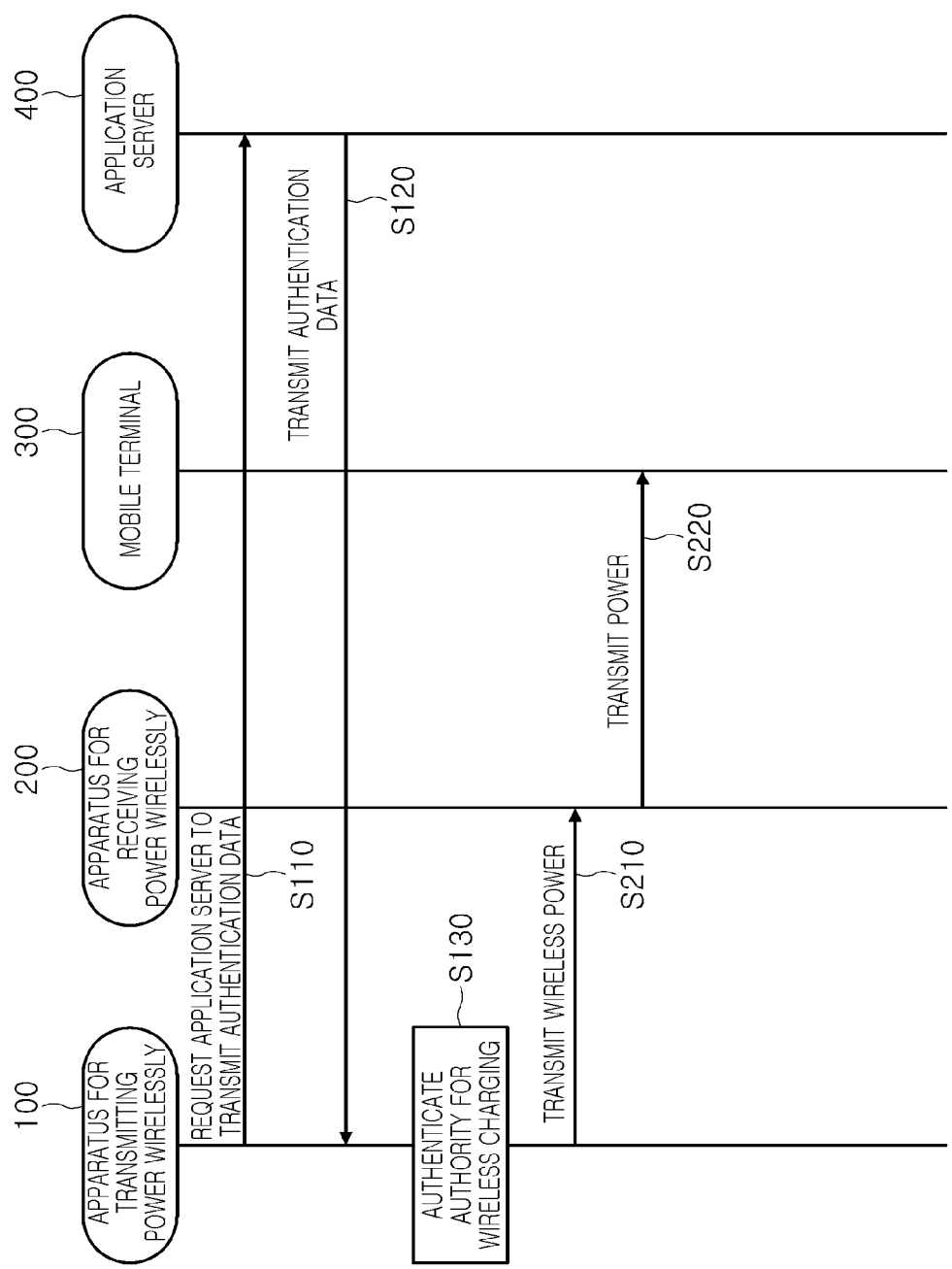

FIG. 23 illustrates another example of an authentication method. In the authentication method illustrated in FIG. 23, the authentication is performed using the application server 400. However, procedures (S210) and (S220) after the authentication is performed correspond to the procedures described above with respect to FIG. 20.

In the examples illustrated in FIGS. 20 to 22, the apparatus for transmitting power wirelessly 100 performs the authentication for the mobile terminal 300 by itself using the authentication information. For example, the apparatus for transmitting power wirelessly 100 may include a verifier that verifies the authentication information to perform the authentication.

In the example illustrated in FIG. 23, the apparatus for transmitting power wirelessly 100 communicates with the application server 400 to perform the authentication for the mobile terminal 300.

In detail, the apparatus for transmitting power wirelessly 100 requests the application server 400 to transmit the authentication data (S110). The application server 400 transmits the authentication data to the apparatus for transmitting power wirelessly 100 (S120). The apparatus for transmitting power wirelessly 100 authenticates the mobile terminal 300 or the apparatus for receiving power wirelessly 200 using the authentication data transmitted by the application server 400 (S130).

The authentication data may include additional information, for example, information regarding whether or not authentication accounting is made, a time period during which authentication is permitted, or other information regarding authentication, in addition to information regarding whether or not the authentication is possible, and the application server 400 may transmit the additional information to the apparatus for transmitting power wirelessly 100 to enable power to be transmitted in various forms.

Figure 24:
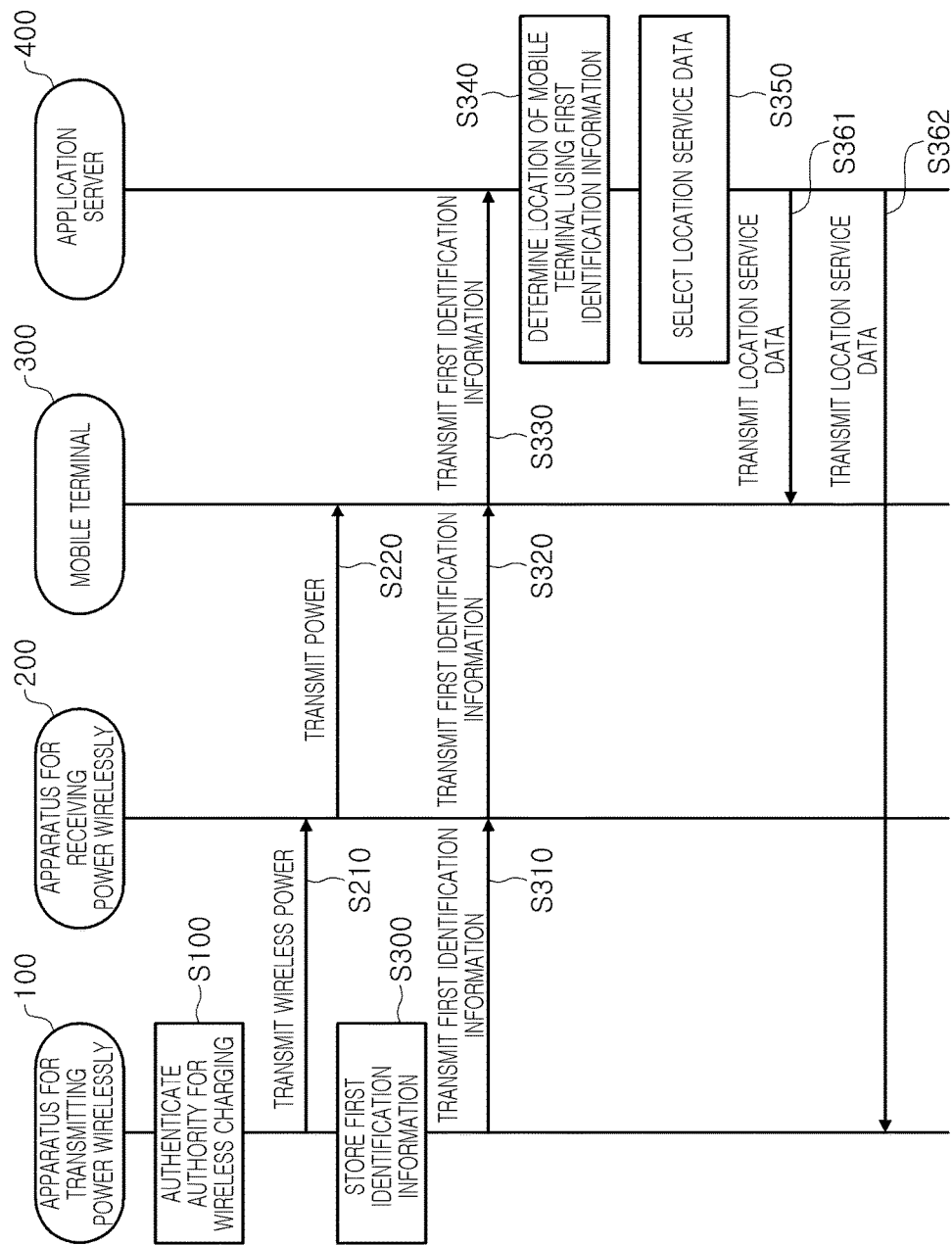
FIGS. 24 through 26 illustrate various examples of a method of transmitting identification information for selecting location data.
Figure 25:
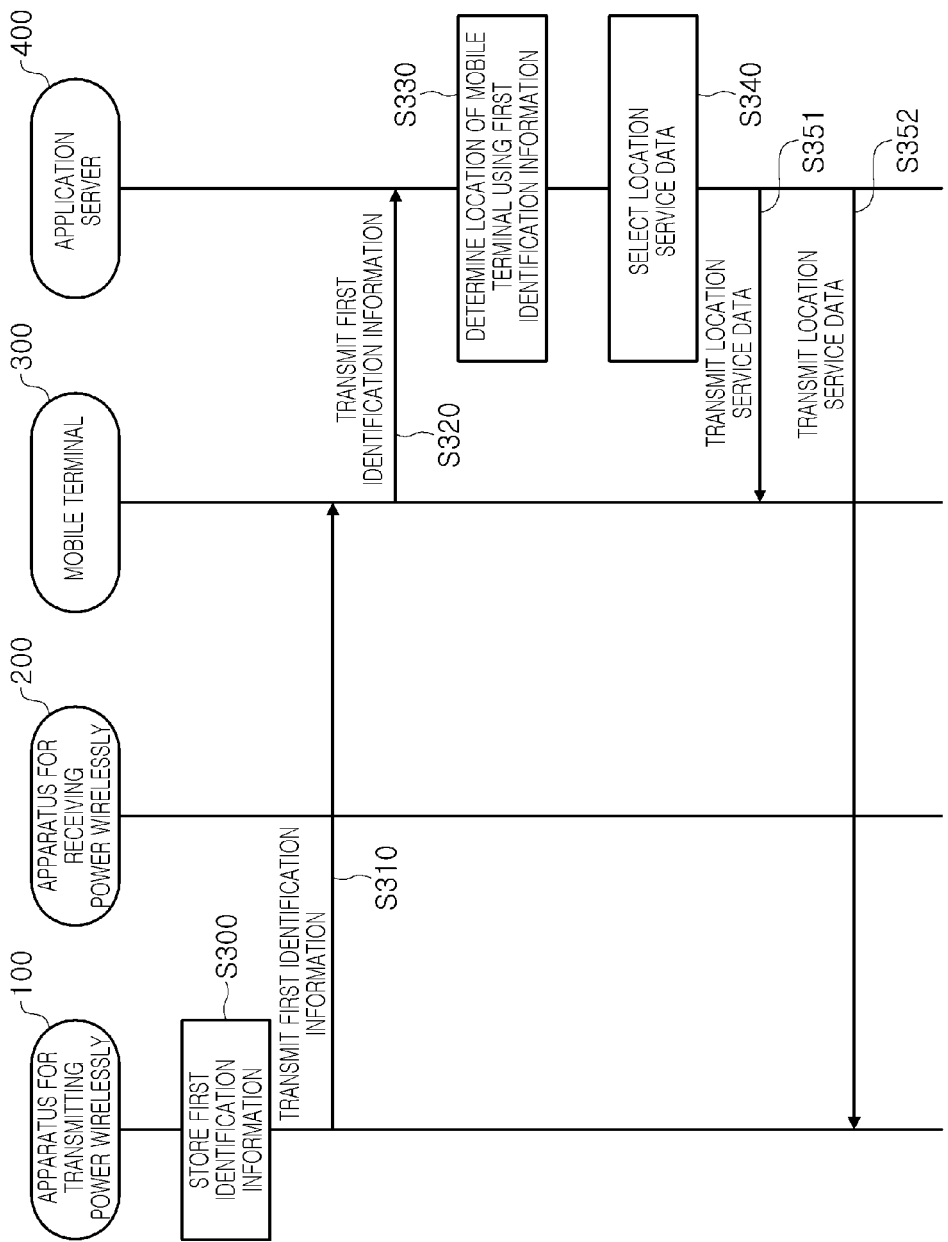
Figure 26:
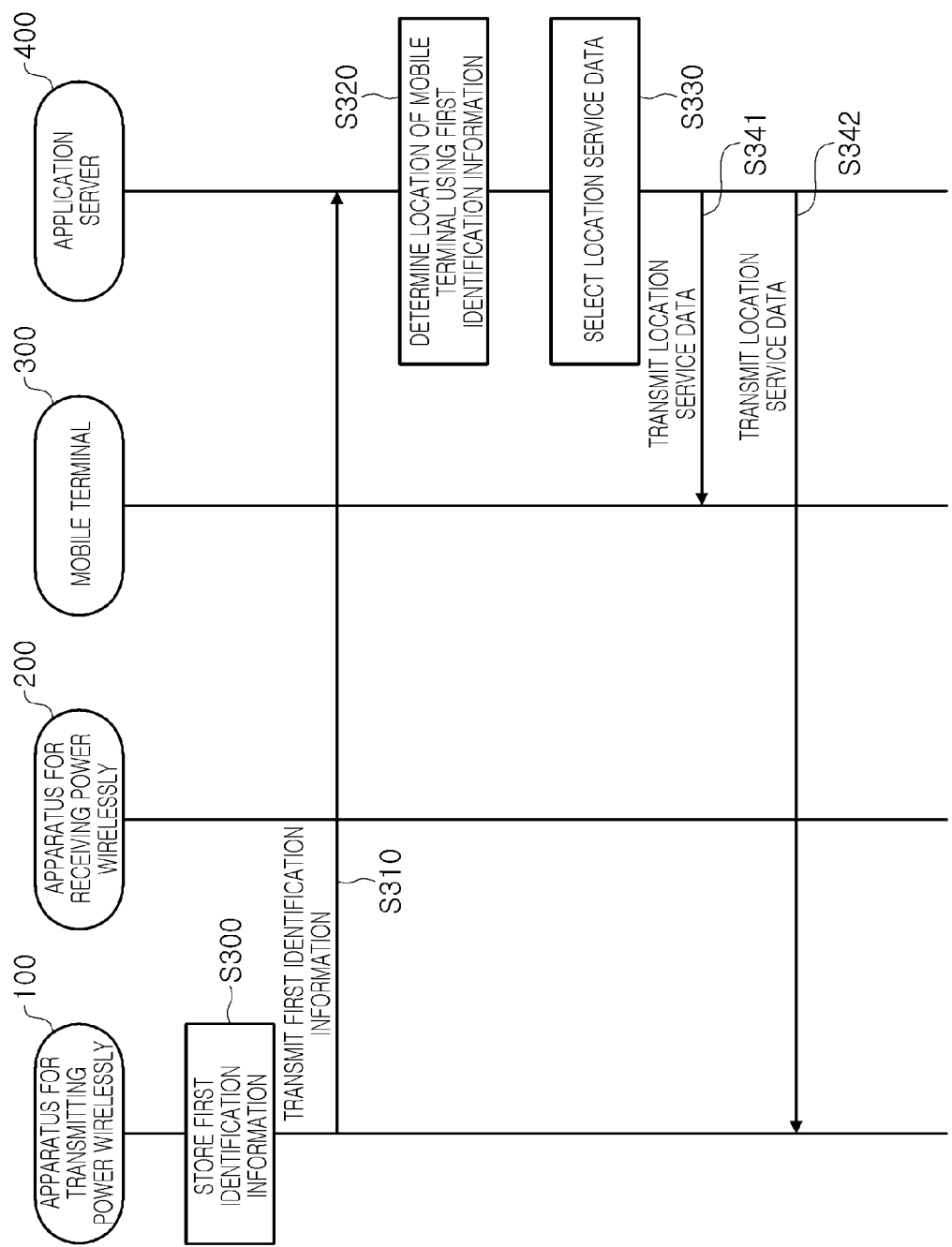

FIGS. 24 through 26 illustrate various examples of a method of transmitting identification information for selecting location data.

In the example of FIG. 24, when an authority for wireless charging is authenticated (S100), the apparatus for transmitting power wirelessly 100 stores the first identification information allocated to the apparatus for transmitting power wirelessly 100 (S300), transmits the first identification information to the application server 400 through the apparatus for receiving power wirelessly 200 and the mobile terminal 300 (S310, S320, S330). However, an authentication process may also be omitted in other examples. Procedures (S210) and (S220) after the authentication is performed correspond to the procedures described above with respect to FIG. 20.

As a communications method between the apparatus for transmitting power wirelessly 100 and the apparatus for receiving power wirelessly 200 or a communications method between the apparatus for receiving power wirelessly 200 and the mobile terminal 300, various communications schemes as described above may be used. For example, various schemes such as the protocol for transmitting power wirelessly, the short distance wireless communications scheme, or any other communications scheme known to one of ordinary skill in the art may be used.

The application server 400 determines the location of the mobile terminal 300 using the first identification information allocated to the apparatus for transmitting power wirelessly 100 (S340). For example, the application server 400 identifies the location in which the apparatus for transmitting power wirelessly 100 is installed using the first identification information allocated to the apparatus for transmitting power wirelessly 100 and determines the identified location as the location of the mobile terminal 300.

The application server 400 selects the location service data associated with the identified location (S350), and transmits the selected location service data to one or both of the mobile terminal 300 (S361) and the apparatus for transmitting power wirelessly 100 (S362).

In one example, the application server 400 selects the location service data using the user information regarding the mobile terminal 300. For example, the application server 400 determines a kind and quality of location service data, a subscription service or a free service for the location service data, and other characteristics of the location service data, depending on a grade or an authority of user. For example, the location service data may include a coupon, a free service code for power charging, or other offers. Alternatively, the location service data may be transmitted only in the case in which a specific condition, for example, a condition in which a transmitted advertisement is viewed, or other condition, is satisfied.

In the example of FIG. 25, the apparatus for transmitting power wirelessly 100 stores the first identification information allocated to the apparatus for transmitting power wirelessly 100 (S300), transmits the first identification information to the mobile terminal 300 (S310), and the mobile terminal 300 transmits the first identification information to the application server 400 (S320). In one example, the mobile terminal 300 transmits the second identification information allocated to the mobile terminal 300, together with the first identification information, to the application server 400.

The application server 400 determines the location of the mobile terminal 300 using the first identification information allocated to the apparatus for transmitting power wirelessly 100 (S330), selects the location service data associated with the identified location (S340), and transmits the selected location service data to one or both of the mobile terminal 300 (S351) and the apparatus for transmitting power wirelessly 100 (S352).

In an example of FIG. 26, the apparatus for transmitting power wirelessly 100 stores the first identification information allocated to the apparatus for transmitting power wirelessly 100 (S300), and directly transmits the first identification information to the application server 400 (S310). In one example, the apparatus for transmitting power wirelessly 100 obtains the second identification information allocated to the mobile terminal 300 from the mobile terminal 300 and transmits the obtained second identification information, together with the first identification information, to the application server 400.

The application server 400 determines the location of the mobile terminal 300 using the first identification information allocated to the apparatus for transmitting power wirelessly 100 (S320), selects the location service data associated with the identified location (S330), and transmits the selected location service data to one or both of the mobile terminal 300 (S341) and the apparatus for transmitting power wirelessly 100 (S342).

Figure 27:
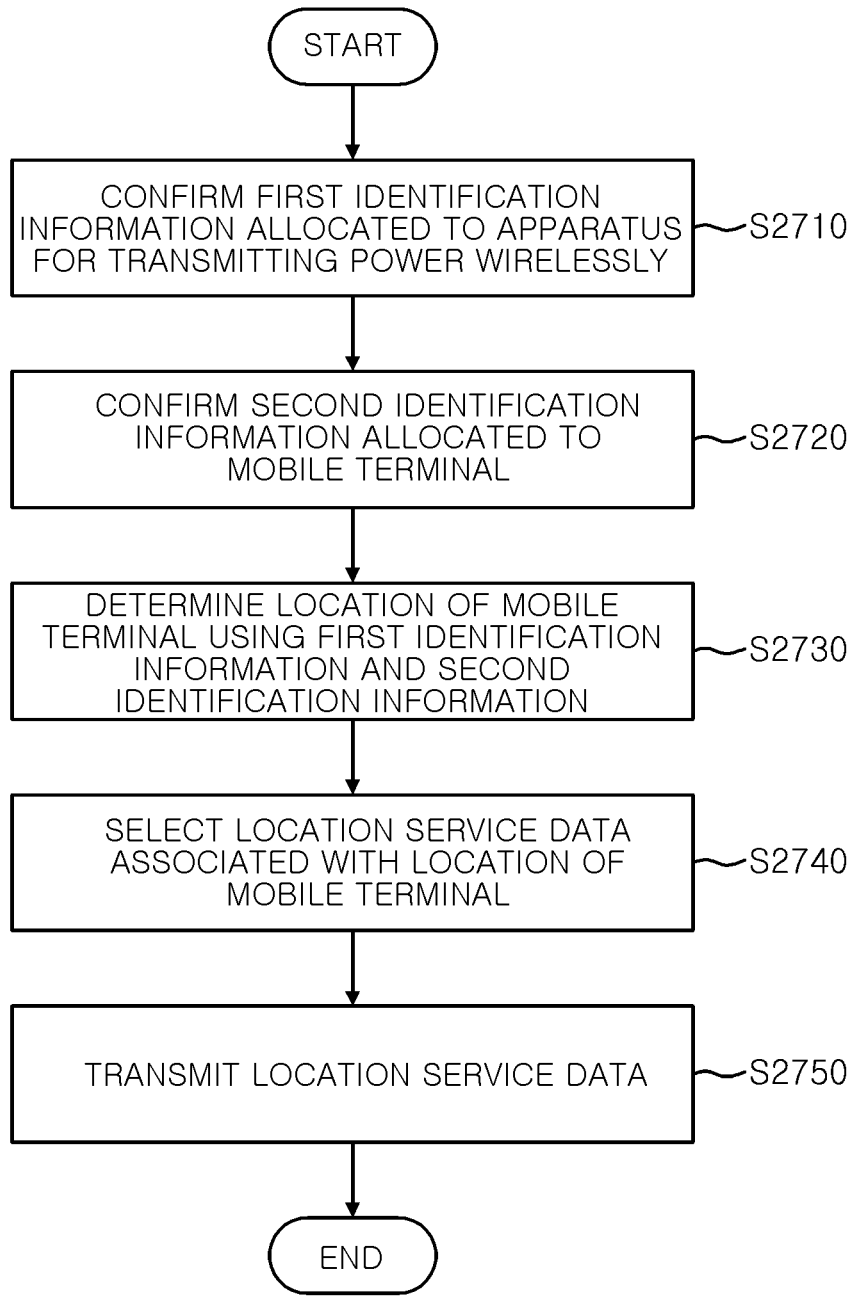
FIG. 27 illustrates an example of a location service transmitting method that is performed in the application server.

FIG. 27 illustrates an example of a location service transmitting method that is performed in the application server 400.

The application server 400 confirms the first identification information allocated to the apparatus for transmitting power wirelessly 100 (S2710).

The application server 400 confirms the second identification information allocated to the mobile terminal 300 (S2720).

The application server 400 determines the location of the mobile terminal 300 using the first identification information or the first identification information and the second identification information (S2730).

The application server 400 selects the location service data associated with the determined location of the mobile terminal (S2740), and transmits the selected location service data to one or both of the mobile terminal 300 and the apparatus for transmitting power wirelessly 100 (S2750).

As described above, the location-based service of a user may be transmitted using information regarding a location at which wireless charging is performed.

In addition, as described above, a location-based service may be transmitted to a user based on a location of a wireless charging apparatus, thereby accurately identifying the location regardless of an influence of an environment around the user.

Further, as described above, since the location-based service as well as the wireless power may be transmitted, a user's access to services may be expanded.

The apparatus for transmitting power wirelessly 100, the controller 105, the short distance wireless power communications transceiver 106, the power transmitter 110, the identification information manager 120, the short distance wireless communications transceiver 130, the power charging controller 140, the communications transceiver 150, the apparatus for receiving power wirelessly 200, the controller 204, the short distance wireless power communications transceiver 205, the power receiver 210, the identification information transmitter 220, the short distance wireless communications transceiver 230, the mobile terminal 300, the power charger 310, the controller 330, the application server 400, the memory 410, and the location service transmitter 420 described with respect to FIGS. 1-27 and the methods described with respect to FIGS. 1-27 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Functional programs, codes, and code segments for implementing the examples disclosed herein can be easily constructed by a programmer skilled in the art to which the examples pertain based on the drawings and their corresponding descriptions as provided herein.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for transmitting power wirelessly comprising:
   a power transmitter configured to transmit power wirelessly to an external apparatus; and
   an identification information manager configured to:
      transmit first identification information allocated to the apparatus for transmitting power wirelessly to an application server,
      obtain, from a mobile terminal, second identification information allocated to the mobile terminal using a short distance wireless communications transceiver, and
      transmit the second identification information to the application server.

2. The apparatus for transmitting power wirelessly of claim 1, wherein the first identification information is associated with zone information regarding a zone in which the apparatus for transmitting power wirelessly is located.

3. The apparatus for transmitting power wirelessly of claim 1, further comprising a power charging controller configured to authenticate an authority for wireless charging of the external apparatus.

4. The apparatus for transmitting power wirelessly of claim 3, wherein the identification information manager is further configured to transmit the first identification information to the external apparatus in response to the authority for the wireless charging of the external apparatus being authenticated.

5. The apparatus for transmitting power wirelessly of claim 3, wherein the power charging controller is further configured to perform an authentication using any one or any combination of communications service provider information, terminal information, user information, and remaining power information of the mobile terminal connected to the external apparatus.

6. The apparatus for transmitting power wirelessly of claim 3, wherein the power charging controller is further configured to determine the authority or a provision time for the wireless charging of the external apparatus using authentication information transmitted by an application server having received the first identification information.

7. The apparatus for transmitting power wirelessly of claim 1, further comprising:
   a communications transceiver connectable to an application server; and
   a service data manager configured to receive location service data associated with a zone in which the apparatus for transmitting power wirelessly is located from the application server.

8. The apparatus for transmitting power wirelessly of claim 1, wherein the short distance wireless communications transceiver is wirelessly connectable to the mobile terminal in which the external apparatus is mounted or that is connectable to the external apparatus.

9. An apparatus for receiving power wirelessly connectable to a mobile terminal, the apparatus for receiving power wirelessly comprising:
   a power receiver configured to wirelessly receive power transmitted by an apparatus for transmitting power wirelessly; and
   an identification information transmitter configured to receive first identification information associated with a location of the apparatus for transmitting power wirelessly from the apparatus for transmitting power wirelessly and transmit the first identification information to the mobile terminal.

10. The apparatus for receiving power wirelessly of claim 9, wherein the identification information transmitter is further configured to use an identifier of the apparatus for wirelessly transmitting power used in a protocol for transmitting and wirelessly receiving power as the first identification information.

11. The apparatus for receiving power wirelessly of claim 9, further comprising a short distance wireless communications transceiver; wherein the identification information transmitter is further configured to receive the first identification information from the apparatus for transmitting power wirelessly using the short distance wireless communications unit.

12. The apparatus for receiving power wirelessly of claim 9, wherein the identification information transmitter is further configured to obtain second identification information allocated to the mobile terminal and transmit the second identification information to the apparatus for transmitting power wirelessly.

13. A mobile terminal comprising:
a power charger connectable to an apparatus for receiving power wirelessly and configured to receive power from the apparatus for receiving power wirelessly and charge a power storage of the mobile terminal using the received power; and
a controller configured to obtain first identification information regarding a zone in which an apparatus for transmitting power wirelessly is located and transmit second identification information allocated to the mobile terminal or the first identification information to an application server.

14. The mobile terminal of claim 13, wherein the controller is further configured to receive location service data associated with a zone in which the mobile terminal is located from the application server.

15. A mobile terminal comprising:
a power charger connectable to an apparatus for receiving power wirelessly and configured to receive power from the apparatus for receiving power wirelessly and charge a power storage of the mobile terminal using the received power; and
a controller configured to transmit first identification information allocated to the mobile terminal to an apparatus for transmitting power wirelessly and receive location service data associated with a zone in which the mobile terminal is located from the apparatus for transmitting power wirelessly.

16. An application server comprising:
a memory configured to store location data in which first identification information allocated to an apparatus for transmitting power wirelessly and zone information regarding a zone in which the apparatus for transmitting power wirelessly is located are associated with each other; and
a location service transmitter configured to determine a location of a mobile terminal receiving power from the apparatus for transmitting power wirelessly using the zone information.

17. The application server of claim 16, wherein the location service transmitter is further configured to use the first identification information and second identification information allocated to the mobile terminal to determine the zone in which the apparatus for transmitting power wirelessly is located as the location of the mobile terminal.

18. The application server of claim 16, wherein the location service transmitter is further configured to transmit location service data associated with the determined location of the mobile terminal to either one or both of the mobile terminal and the apparatus for transmitting power wirelessly.

19. A non-transitory computer-readable medium, of a mobile terminal, comprising instructions that, when executed, cause one or more processors to perform:
a function of obtaining first identification information associated with a location of an apparatus for transmitting power wirelessly;
a function of managing second identification information allocated to the mobile terminal; and
a function of transmitting either one or both of the first identification information and the second identification information to another device.

20. The non-transitory computer-readable medium of claim 19, further comprising a function of receiving and displaying location service data associated with a location of the mobile terminal.

21. A location-based service system comprising:
an apparatus for transmitting power wirelessly configured to transmit power wirelessly to an apparatus for receiving power wirelessly;
a mobile terminal configured to receive power received by the apparatus for receiving power wirelessly; and
an application server configured to identify a location of the apparatus for transmitting power wirelessly, and transmit location-based service data to the mobile terminal, the location-based service data being based on the identified location of the apparatus for transmitting power wirelessly.

* * * * *